United States Patent
Okamoto

(10) Patent No.: US 7,497,210 B2
(45) Date of Patent: Mar. 3, 2009

(54) AIR-FUEL RATIO DETECTION APPARATUS OF INTERNAL COMBUSTION ENGINE

(75) Inventor: Akihiro Okamoto, Chiryu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/727,917

(22) Filed: Mar. 29, 2007

(65) Prior Publication Data

US 2007/0240695 A1    Oct. 18, 2007

(30) Foreign Application Priority Data

| Apr. 13, 2006 | (JP) | ............................. 2006-110366 |
| May 23, 2006 | (JP) | ............................. 2006-143031 |
| Jul. 4, 2006 | (JP) | ............................. 2006-184135 |

(51) Int. Cl.
*F02D 41/02* (2006.01)
*F02D 41/00* (2006.01)
(52) U.S. Cl. ...................... 123/673; 123/703
(58) Field of Classification Search ................ 123/434, 123/486, 673, 692, 703, 679, 672; 701/109; 60/276
See application file for complete search history.

(56) References Cited

U.S. PATENT DOCUMENTS

| 5,947,095 | A |  | 9/1999 | Kato |  |
|---|---|---|---|---|---|
| 6,830,042 | B2 |  | 12/2004 | Ikemoto |  |
| 7,051,725 | B2 |  | 5/2006 | Ikemoto et al. |  |
| 7,063,080 | B2 | * | 6/2006 | Kita et al. | .................... 123/673 |
| 7,195,008 | B2 | * | 3/2007 | Annoura et al. | ............. 123/674 |
| 2005/0022797 | A1 | * | 2/2005 | Ikemoto et al. | ............. 123/673 |
| 2005/0075781 | A1 | * | 4/2005 | Mizuno et al. | .............. 701/109 |
| 2005/0121010 | A1 | * | 6/2005 | Kita et al. | .................... 123/673 |

FOREIGN PATENT DOCUMENTS

JP       2001-82221    3/2001

* cited by examiner

*Primary Examiner*—Mahmoud Gimie
(74) *Attorney, Agent, or Firm*—Nixon & Vanderhye P.C.

(57) ABSTRACT

In a multi-cylinder engine, to compute the air-fuel ratio of each cylinder by an air-fuel ratio sensor disposed in an exhaust pipe, a cylinder is determined by a crank angle detected by a crank angle sensor. A deviation in the air-fuel ratio of each cylinder is detected on the basis of the output signal of the air-fuel ratio sensor disposed in the exhaust pipe and the forcibly changed quantity of the air-fuel ratio.

25 Claims, 20 Drawing Sheets

BEFORE CHANGING

AFTER CHANGING

AIR-FUEL RATIO DETECTION APPARATUS OF INTERNAL COMBUSTION ENGINE

CROSS-REFERENCE TO RELATED APPLICATION

This application is based on Japanese Patent Applications No. 2006-110366 filed on Apr. 13, 2006, No. 2006-143031 filed on May 23, 2006, and No. 2006-184135 filed on Jul. 4, 2006, the disclosures of which are incorporated herein by reference.

FIELD OF THE INVENTION

The present invention relates to an air-fuel ratio detection apparatus of an internal combustion engine. The apparatus detects the air-fuel ratio of exhaust gas of each cylinder on the basis of the signal of an air-fuel ratio sensor disposed in an exhaust pipe in a multi-cylinder engine.

BACKGROUND OF THE INVENTION

In an exhaust emission control system of an engine, a three-way catalyst is disposed in an exhaust pipe and exhaust gas is cleaned by this three-way catalyst. When the air-fuel ratio of the exhaust gas is controlled to a stoichiometric air-fuel ratio, the three-way catalyst disposed in the exhaust pipe can efficiently clean the exhaust gas. For this reason, an air-fuel ratio sensor is disposed in the exhaust pipe and the air-fuel ratio of the exhaust gas is feedback controlled on the basis of the detected signal of the air-fuel ratio sensor, whereby the air-fuel ratio of the exhaust gas is controlled to the stoichiometric air-fuel ratio. However, the exhaust gas does not collide uniformly with the air-fuel ratio sensor, so it can be thought that the air-fuel ratio of only a specific cylinder is different from those of the other cylinders. In this case, there is a possibility that the air-fuel ratio of the specific cylinder is substantially different from an air-fuel ratio when the engine is viewed as a whole and hence deviates from the stoichiometric air-fuel ratio by a large amount.

For this reason, to control the air-fuel ratio with higher accuracy, a technology for detecting the air-fuel ratio of each cylinder has been known. For example, JP-A-2001-82221 discloses a technology for computing, by a crank angle, the timing in which the air-fuel ratio of each cylinder is detected, computing the air-fuel ratio of each cylinder on the basis of the air-fuel ratio detected at the timing, and feeding back the air-fuel ratio for each cylinder.

However, even if the detected air-fuel ratios of the cylinders are equal to each other, there is a case in which an air-fuel ratio detected by an air-fuel ratio sensor disposed in the exhaust collecting portion of an exhaust pipe is different from an actual air-fuel ratio, for example, because the shape of the exhaust pipe is different.

JP-A-2004-316483 (U.S. Pat. No. 6,830,042B2) discloses cylinder air-fuel ratio control for estimating the air-fuel ratios of a plurality of cylinders for the respective cylinders on the basis of the output of one air-fuel ratio sensor disposed in an exhaust collecting portion where exhaust gases from a plurality of cylinders merge with each other and controlling the air-fuel ratios of the plurality of cylinders (fuel injection quantities) for the respective cylinders.

Variations in the fuel injection quantity of each cylinder may be caused by the individual difference of a fuel injection system of each cylinder (variations in manufacture and time deterioration of an injection valve). Thus, even if the air-fuel ratios of the plurality of cylinders can be estimated with high accuracy for the respective cylinders on the basis of the output of the one air-fuel ratio sensor disposed in the exhaust collecting portion, variations in the air-fuel ratio between the cylinders may be increased by the individual differences of the fuel injection systems of the respective cylinders while the cylinder air-fuel ratio is performed. These variations in the air-fuel ratio between the cylinders become a cause of reducing the accuracy of the cylinder air-fuel ratio control to degrade emission and fuel consumption.

To reduce variations in the air-fuel ratio between cylinders of an internal combustion engine to improve the accuracy of air-fuel ratio control, a system is disclosed in Japanese Patent No. 3299120 (U.S. Pat. No. 5,947,095) and JP-A-2004-316483. In the system, a model of relating the detected value of an air-fuel ratio sensor disposed in an exhaust collecting portion of an internal combustion engine (the air-fuel ratio of the exhaust collecting portion) to a cylinder air-fuel ratio (air-fuel ratio of each cylinder) constructs an observer having a cylinder air-fuel ratio as a state variable, estimates the air-fuel ratio of each cylinder from the observation result of the observer, and corrects the fuel injection quantity of each cylinder according to the deviation between the estimated air-fuel ratio of each cylinder and a target air-fuel ratio, thereby making the air-fuel ratio of each cylinder equal to the target air-fuel ratio.

However, as described above, in the system for estimating the air-fuel ratio of each cylinder on the basis of the model of relating the detected value of the air-fuel ratio sensor to a cylinder air-fuel ratio (air-fuel ratio of each cylinder) as the state variable, as shown in FIG. 19A, when the air-fuel ratio of each cylinder is estimated, in the same manner as usual, at the time when the operating state of an internal combustion engine is suddenly changed, the air-fuel ratio of each cylinder in the present operating state is estimated by the use of a state variable in a different operating state in the past. Thus, the system has a shortcoming that the accuracy of estimating the air-fuel ratio of each cylinder may be remarkably reduced, which results in reducing the control accuracy of the air-fuel ratio of each cylinder.

SUMMARY OF THE INVENTION

It is an object of the present invention to provide an air-fuel ratio detection apparatus of an internal combustion engine capable of detecting a deviation in the air-fuel ratio of each cylinder on the basis of the air-fuel ratio detected by an air-fuel ratio sensor.

Moreover, it is another object of the present invention to provide a cylinder air-fuel ratio control apparatus of an internal combustion engine capable of correcting variations in the air-fuel ratio between cylinders.

Furthermore, it is still another object of the present invention to provide a cylinder air-fuel ratio control apparatus of an internal combustion engine capable of reducing a reduction in the estimation accuracy of the air-fuel ratio of each cylinder when the operating state of the internal combustion engine is suddenly changed.

According to the present invention, there is provided an apparatus for detecting variations in an air-fuel ratio between cylinders of a multi-cylinder engine and including: air-fuel ratio detection means disposed upstream of a catalyst disposed in an exhaust pipe, for detecting an air-fuel ratio of exhaust gas; and cylinder determination timing computation means for computing timing for detecting an air-fuel ratio of each cylinder, the apparatus including: air-fuel ratio change means for forcibly changing the air-fuel ratio of each cylinder; and cylinder air-fuel-ratio deviation estimation means for estimating a deviation in the air-fuel ratio of each cylinder on the basis of an air-fuel ratio detected by the air-fuel ratio detection means at timing computed by the cylinder determination timing computation means when an air-fuel ratio is changed by the air-fuel ratio change means. In this manner, the air-fuel ratio is forcibly changed to change an air-fuel ratio detected upstream of the catalyst disposed in the exhaust pipe, so a deviation in an air-fuel ratio of each cylinder can be estimated with high accuracy.

According to the present invention, there is provided a cylinder air-fuel ratio control apparatus of an internal combustion engine that has a valve unit disposed at an intake port and/or an exhaust port of each cylinder in such a way that the valve unit can be opened and closed independently of each cylinder, has an air-fuel ratio sensor disposed in an exhaust merging section where exhaust gas from a plurality of cylinders merges, and controls air-fuel ratios of the plurality of cylinders for each cylinder on the basis of an output of the air-fuel ratio sensor, the cylinder air-fuel ratio control apparatus including cylinder air-fuel-ratio correction quantity learning means for learning a cylinder air-fuel-ratio correction quantity for correcting variations in an air-fuel ratio between the cylinders for each cylinder of the plurality of cylinders. The cylinder air-fuel-ratio correction quantity learning means performs fuel injection and an operation of opening and closing the valve unit only for a part of the plurality of cylinders in a state in which the fuel injection and the operation of opening and closing the valve unit are stopped for other cylinders in a period during which the cylinder air-fuel-ratio correction quantity is learned to control an air-fuel ratio on the basis of the output of the air-fuel ratio sensor, thereby learning the cylinder air-fuel-ratio correction quantity of the part of cylinders.

A cylinder for which fuel injection and an operation of opening and closing the valve unit is stopped is referred to as "stopped cylinder" and a cylinder for which the fuel injection and the operation of opening and closing the valve unit is performed is referred to as "operating cylinder".

According to the present invention, the cylinder air-fuel-ratio correction quantity learning means performs fuel injection and an operation of opening and closing the valve unit only for a part of the plurality of cylinders in a state in which the fuel injection and the operation of opening and closing the valve unit are stopped for other cylinders in a period during which the cylinder air-fuel-ratio correction quantity is learned to control an air-fuel ratio on the basis of the output of the air-fuel ratio sensor. Thus, the air-fuel-ratio of the operating cylinder can be detected with high accuracy on the basis of the output of the air-fuel ratio sensor. For this reason, when the air-fuel ratio of exhaust gas of the operating cylinder is feed-back controlled to a target air-fuel ratio (for example, stoichiometric air-fuel ratio), the air-fuel-ratio correction quantity of the operating cylinder, set by the air-fuel-ratio feedback control, becomes a cylinder air-fuel-ratio correction quantity for correcting variations in an air-fuel ratio between the cylinders for the operating cylinder. Accordingly, when this cylinder air-fuel-ratio correction quantity is learned for each cylinder, variations in the air-fuel ratio between the cylinders can be corrected from this learned value and hence the cylinder air-fuel ratio control can be performed with high accuracy.

According to the present invention, there is provided a cylinder air-fuel ratio control apparatus that includes an air-fuel ratio sensor for detecting an air-fuel ratio of exhaust gas and disposed in an exhaust merging section where exhaust gas of each cylinder of the internal combustion engine collects and that estimates an air-fuel ratio of each cylinder on the basis of a model in which a detected value of the air-fuel sensor is related to the air-fuel ration of each cylinder as a state variable, the cylinder air-fuel ratio control apparatus determining by determination means whether an engine operating state is an operating state in which the estimation of the air-fuel ratio of each cylinder is difficult (hereinafter referred to as "operating state in which the estimation of a cylinder air-fuel ratio is difficult") and resets the state variable by state variable rest means when it is determined by the determination means that an engine operating state is the operating state in which estimation of a cylinder air-fuel ratio is difficult.

In this construction, when the operating state of the internal combustion engine is suddenly changed to bring the engine operating state to the operating state in which the estimation of a cylinder air-fuel ratio is difficult, the state variable can be reset and returned to an initial value. Thus, when the air-fuel ratio of each cylinder is estimated next time, the air-fuel ratio of each cylinder in a present operating state can be estimated by the use of the reset state variable of an initial state without using the state variable affected by the past different operating state. Accordingly, a reduction in the estimation accuracy of the air-fuel ratio of each cylinder when the operating state of the internal combustion engine is suddenly changed can be reduced.

DETAILED DESCRIPTION OF THE PREFERRED EMBODIMENTS

Figure 1:
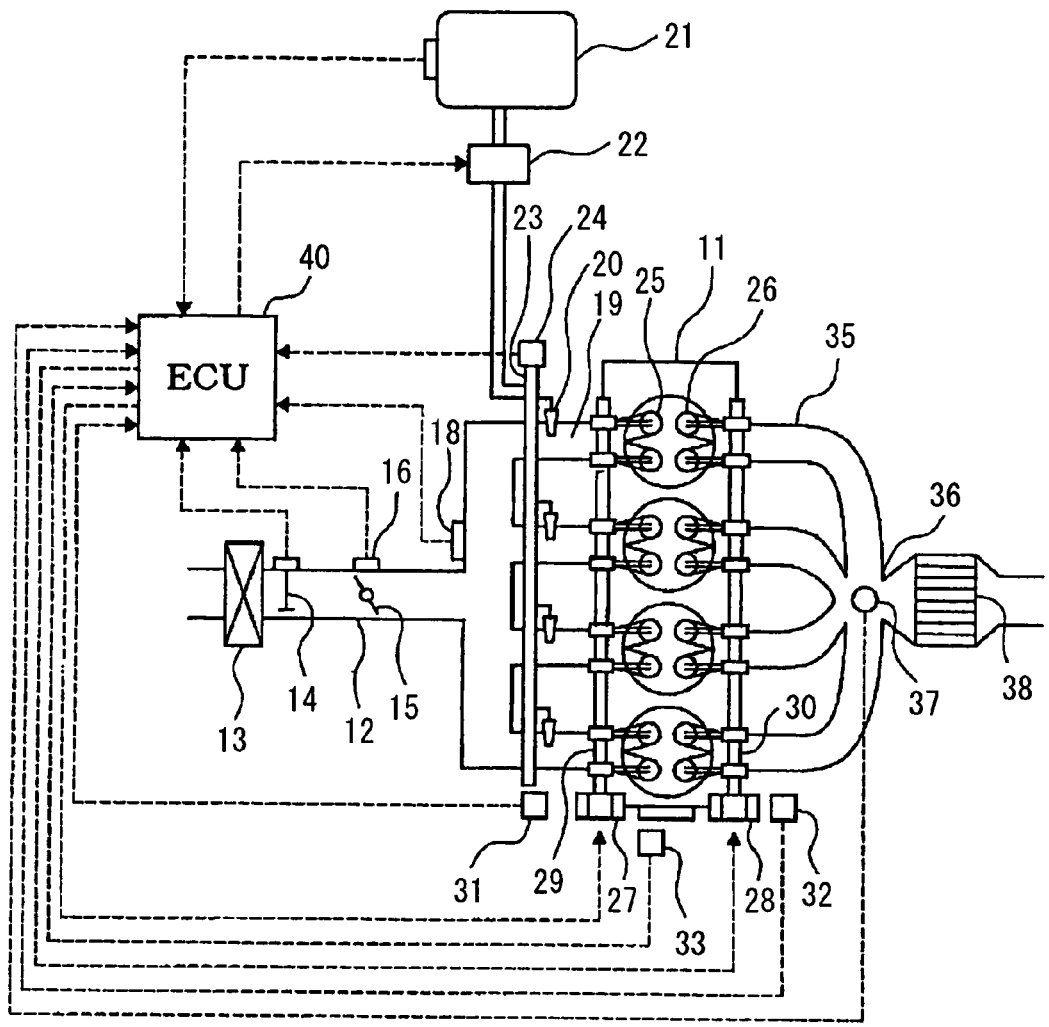
FIG. 1 is a construction diagram in this embodiment.
Figure 2A:
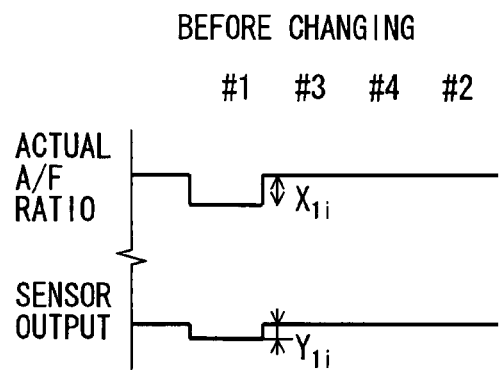
FIGS. 2A and 2B are image diagrams when a cylinder difference of a specified cylinder is detected.
Figure 2B:
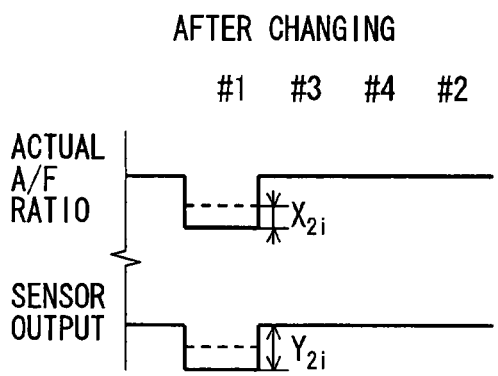

The embodiments of the present invention will be described below with reference to the drawings.

First Embodiment

A first embodiment of the present invention will be described with reference to FIG. 1 to FIG. 4. First, the general construction of an engine control system will be described with reference to FIG. 1. An air cleaner 13 is disposed in the upstream portion of an intake pipe 12 of an internal combustion engine, for example, an in-line four-cylinder engine 11. An air flow meter 14 for detecting an intake air quantity is disposed downstream of the air cleaner 13. A throttle valve 15 having its opening controlled by a motor or the like and a throttle position sensor 16 for detecting a throttle opening are disposed downstream of the air flow meter 14.

Moreover, a surge tank 17 is disposed downstream of the throttle valve 15. The surge tank 17 is provided with an intake pipe pressure sensor 18 for detecting an intake pipe pressure. The surge tank 17 is provided with an intake manifold 19 for introducing air into the respective cylinders of the engine 11. Fuel injection valves 20 for injecting fuel are secured near the intake ports of the intake manifold 19 of the respective cylinders, respectively. While the engine is operated, fuel in a fuel tank 21 is sent to a delivery pipe 23 by a fuel pump 22 and is injected from the fuel injection valves 20 of the respective cylinders at injection timings of the respective cylinders. The delivery pipe 23 is provided with a fuel pressure sensor 24 for detecting the pressure of the fuel (fuel pressure).

The engine 11 is provided with variable valve timing mechanisms 27, 28 for varying the opening and closing timings of intake valves 25 and exhaust valves 26. The engine 11 is provided with an intake cam angle sensor 31 for outputting a cam angle signal in synchronization with the rotation of an intake camshaft 29 and an exhaust cam angle sensor 32 for outputting a cam angle signal in synchronization with the rotation of an exhaust camshaft 30. Further, the engine 11 is provided with a crank angle sensor 33 for outputting a crank angle signal pulse at intervals of a predetermined crank angle (for example, 30° CA) in synchronization with the rotation of a crankshaft.

An air-fuel ratio sensor 37 for detecting the air-fuel ratio of exhaust gas is disposed in an exhaust gas collection portion 36 where the exhaust manifold 35 of the respective cylinders are collected. A catalyst 38 such as a three-way catalyst for cleaning CO, HC, NOx in the exhaust gas is disposed on the downstream side of the air-fuel ratio sensor 37.

The outputs of various sensors such as the air-fuel ratio sensor 37 are inputted to an engine control circuit (hereinafter denoted as "ECU") 40. The ECU 40 is mainly composed of a microcomputer and executes various engine control programs stored in a built-in ROM (storage medium) to control the fuel injection quantities and ignition timings of the fuel injection valves 20 of the respective cylinders according to the operating state of the engine 11.

Figure 4:
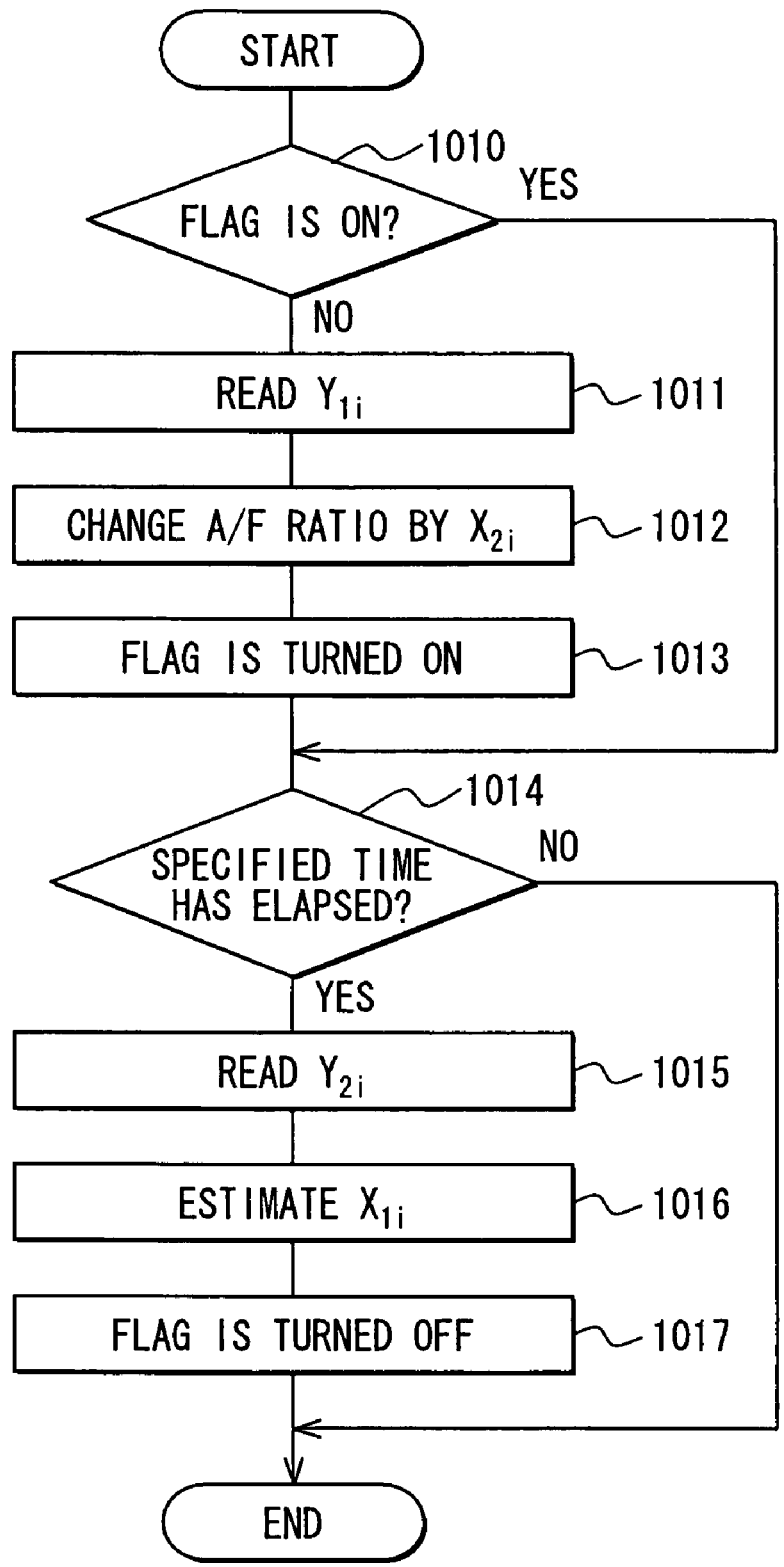
FIG. 4 is a flow chart for detecting the cylinder difference of the specified cylinder.
Figure 5:
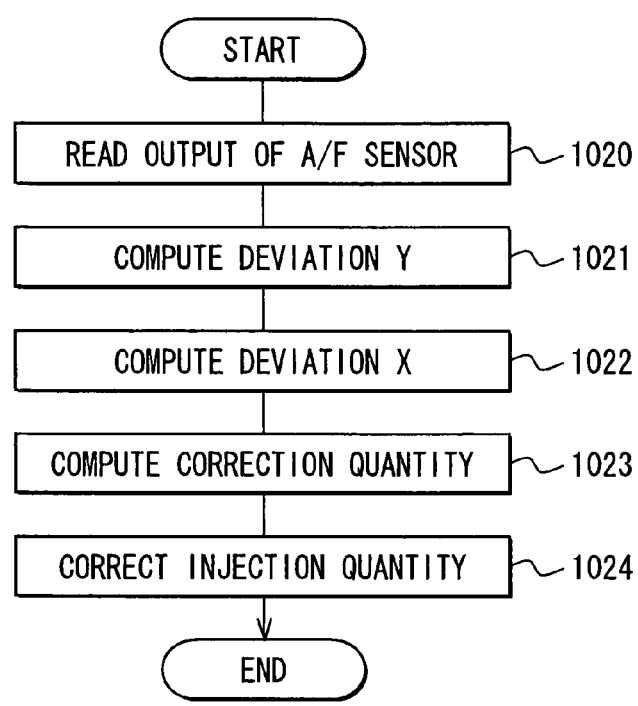
FIG. 5 is a flow chart for correcting the air-fuel ratio of each cylinder.

In this first embodiment, the ECU 40 executes the respective routines of cylinder air-fuel ratio control shown in FIG. 3 to FIG. 5, which is to be described later, to perform the control of forcibly changing the air-fuel ratio of a predetermined cylinder. The ECU 40 computes the deviation (hereinafter referred to as "cylinder difference") between the reference air-fuel ratio of the average value of air-fuel ratios of all cylinders and the actual air-fuel ratio of each cylinder for the respective cylinders on the basis of an air-fuel ratio (actual air-fuel ratio of exhaust gas flowing through the exhaust collection portion 30, detected by the air-fuel ratio sensor 37) before and after performing the control and corrects the air-fuel ratio.

Figure 3:
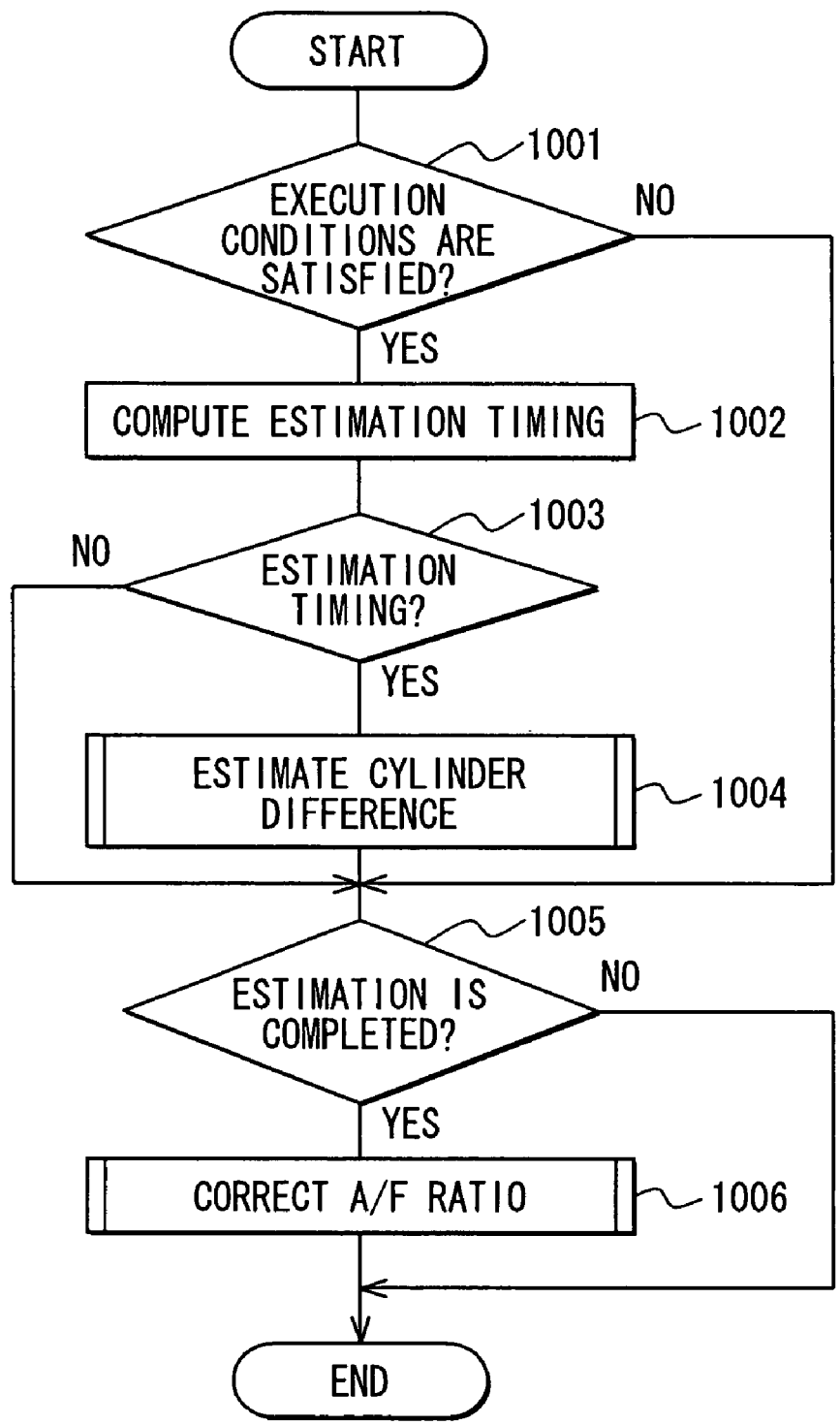
FIG. 3 is a flow chart for correcting the air-fuel ratio of each cylinder on the basis of the cylinder difference of the specified cylinder.

FIG. 3 is a flow chart for feedback controlling an air-fuel ratio of each cylinder on the basis of the cylinder difference of each cylinder. FIG. 4 is a flow chart for computing cylinder difference of each cylinder. FIG. 5 is a flow chart for correcting an air-fuel ratio on the basis of a difference between the cylinders of each cylinder. Processing shown in these flow charts is performed at intervals of a predetermined crank angle.

When the flow chart shown in FIG. 3 is executed, it is determined in step 1001 whether it is a cylinder in which a cylinder difference is to be detected this time and whether execution conditions are satisfied. In this embodiment, when an engine operating state is steady and the air-fuel ratio sensor is active, the cylinder difference is estimated. Whether the engine operating state is steady state is determined, for example, by whether an intake air quantity is not larger than a predetermined value, whether an engine rotation speed is within a predetermined range, whether an engine load is within a predetermined range, or whether an engine cooling water temperature is not lower than a predetermined value. In this manner, by estimating the cylinder difference when the engine operating state is steady and the air-fuel ratio sensor is active, the cylinder difference can be estimated in an operating state in which variations in the air-fuel ratio caused by a change in the operating state are small, so the cylinder difference can be estimated with high accuracy.

When it is determined in step 1001 that it is not a cylinder in which the cylinder difference is to be detected this time or that the execution conditions are not satisfied, the routine proceeds to step 1005 where it is determined whether the estimation of the cylinder difference is completed. Moreover, also when it is a cylinder in which a cylinder difference is to be detected and the estimation of the cylinder difference is completed and the correction of the air-fuel ratio based on the cylinder difference is not completed, the routine proceeds to step 1005.

When the execution conditions are satisfied in step 1001, the routine proceeds to step 1002 where air-fuel ratio estimation timing is computed for each cylinder. In this embodiment, the air-fuel ratio estimation timing of each cylinder is set by a map or the like according to an engine operating state (for example, engine load, engine rotation speed, or the like) in consideration of the fact that the delay from when the exhaust gas discharged from each cylinder reaches the vicinity of the air-fuel ratio sensor 37 until the air-fuel ratio of the exhaust gas is detected varies according to the engine operating state. In general, as the engine load and the engine rotation speed become lower, a delay in response of the exhaust pipe becomes larger. Thus, as the engine load and the engine rotation speed become lower, the air-fuel ratio estimation timing of each cylinder is set so as to be shifted further on a delay side.

The air-fuel ratio estimation timing of each cylinder is computed in step 1002 and then it is determined in step 1003 whether the present time is this air-fuel ratio estimation timing. When it is determined in step 1003 that the present time is not the air-fuel ratio estimation timing, the routine proceeds to step 1005 where the estimation of the cylinder difference is completed.

When it is determined in step 1003 that the present time is the air-fuel ratio estimation timing, the routine proceeds to step 1004 where the processing of estimating the cylinder difference $X1i$ of a cylinder, which is to be detected this time, is performed. When this processing is performed, the routine proceeds to step 1005 where it is determined whether the estimation of the cylinder difference is completed.

It is determined in step 1005 whether the estimation of the cylinder difference of a cylinder, which is to be detected this time, is completed. When it is determined that the estimation of the cylinder difference of a cylinder, which is to be detected this time, is not completed, the processing of this flow chart is finished without making a correction of the air-fuel ratio by the cylinder difference. When it is determined in step 1005 that the estimation of the cylinder difference of a cylinder, which is to be detected this time, is completed, the routine proceeds to step 1006 where the processing of a subordinate flow chart for correcting an air-fuel ratio by the use of the cylinder difference $X1i$ detected in step 1004 is performed. With this, the air-fuel ratio of each cylinder can be corrected on the basis of the air-fuel ratio detected by the air-fuel ratio sensor 37 disposed in the exhaust collecting portion 36. When the correction of the air-fuel ratio of each cylinder to be detected is finished, the processing of this flow chart is finished.

Next, the processing of estimating the cylinder difference $X1i$ will be described by the use of a flow chart shown in FIG. 4. The cylinder difference $X1i$ of a cylinder, which is to be detected this time, can be found by the relationship between a cylinder difference $Y1i$ and a cylinder difference $Y2i$, where the cylinder difference $Y1i$ is the difference between the actual air-fuel ratio $X1i$ before forcibly changing the air-fuel ratio and a reference air-fuel ratio outputted by the air-fuel sensor 37 (the average value of the actual air-fuel ratio of exhaust gas that flows through the exhaust collecting portion 36 and is detected by the air-fuel sensor 37) and the cylinder difference $Y2i$ is the difference between the forcibly changed quantity of air-fuel ratio $X2i$, which is the quantity of a change in the air-fuel ratio after forcibly changing the air-fuel ratio, and the reference air-fuel ratio outputted by the air-fuel ratio sensor 37 (see FIGS. 2A and 2B).

It is determined in step 1010 whether an air-fuel ratio forcible change flag of indicating that the control of forcibly changing the air-fuel ratio of a cylinder to be detected this time is performed is ON. When the air-fuel ratio forcible change flag is OFF, the control of forcibly changing the air-fuel ratio is not performed, so in step 1011 the air-fuel ratio of a predetermined cylinder before forcibly changing the air-fuel ratio is detected by the air-fuel ratio sensor 37 and the cylinder difference $Y1i$ that is the difference between the detected air-fuel ratio and the reference air-fuel ratio is computed. As this reference air-fuel ratio may be used the average value of the air-fuel ratios of all cylinders detected by the air-fuel sensor 37 before forcibly changing the air-fuel ratio or a specified air-fuel ratio (for example, fixed air-fuel ratio such as 14.7).

Next, in step 1012, the fuel injection quantity by the injector is increased or decreased, or the opening of the throttle valve attached to the cylinder is controlled to change an intake air quantity to thereby forcibly change the air-fuel ratio of the cylinder, which is to be detected this time, by the forcibly changed quantity of air-fuel ratio $X2i$. In the case of increasing or decreasing the fuel injection quantity by the injector, it is recommendable to forcibly change the air-fuel ratio of the cylinder, which is to be detected this time, by the forcibly changed quantity of air-fuel ratio $X2i$ in the same operating state in which the intake air quantity is not changed. With this, the forcibly changed quantity of air-fuel ratio $X2i$ can be detected with high accuracy. Moreover, also in the case of changing the intake air quantity, similarly, it is recommendable to forcibly change the air-fuel ratio of the cylinder, which is to be detected this time, by the forcibly changed quantity of air-fuel ratio $X2i$ with the fuel injection quantity held constant and in the same operating state. In step 1013, the air-fuel ratio forcible change flag for indicating that the control of forcibly changing the air-fuel ratio of a cylinder to the detected this time is performed is set ON. Since it takes a specified time after the air-fuel ratio is forcibly changed in this manner before the change in the air-fuel ratio is detected by the air-fuel sensor 37, it is determined in step 1014 whether a specified time elapses. When it is determined in step 1014 that the specified time does not elapse, the estimation of the cylinder difference is not performed but the processing of this flow chart is finished.

When it is determined in step 1014 that the specified time elapses, the routine proceeds to step 1015 where the air-fuel ratio after forcibly changing the air-fuel ratio is detected by the air-fuel ratio sensor 37 and the cylinder difference $Y2i$ of the difference between the detected air-fuel ratio and the reference air-fuel ratio computed by the last time is computed. Next, in step 1016, the cylinder difference $X1i$ is estimated by the use of values computed in steps from 1011 to 1015 (cylinder difference $Y1i$, the forcibly changed quantity of air-fuel ratio $X2i$, and the cylinder difference $X1i$). For example, an equation for estimating the cylinder difference $X1i$ can be found in the following equation.

$$X1i = \{Y1i/(Y2i - Y1i)\} \times X2i \qquad (1)$$

When the cylinder difference $X1i$ of a specified cylinder is estimated by the equation (1), the routine proceeds to step 1017 where the air-fuel ratio forcible change flag is set OFF and a cylinder difference estimation completion flag for indicating that the estimation of the cylinder difference of the cylinder to be detected this time is finished is set ON. When the processing in this flow chart is performed, even in the case where the detected air-fuel ratio is different from an actual air-fuel ratio because the state in which the exhaust gas collides with the air-fuel ratio sensor becomes different because of the shape of the exhaust pipe, a deviation in the actual air-fuel ratio of each cylinder can be estimated with high accuracy.

Next, the processing of correcting the air-fuel ratio of each cylinder on the basis of the cylinder difference $X1i$ will be described with reference to a flow chart shown in FIG. 5. When the processing of this flow chart is performed, first in step 1020, the output of the air-fuel ratio sensor 37 (detected air-fuel ratio) is read, and in the next step 1021 a deviation Y between the detected air-fuel ratio and the reference air-fuel ratio (target air-fuel ratio of all cylinders) of the average value of the air-fuel ratios of all cylinders detected by the air-fuel sensor 37 is found. In step 1022, a deviation X between the air-fuel ratio of a cylinder to be detected this time and the reference air-fuel ratio is estimated. More specifically, the deviation X is found by multiplying a value $(X1i/Y1i)$ by the deviation Y computed in step 1021 $(X=Y\times(X1i/Y1i))$, where the value $(X1i/Y1i)$ is obtained by dividing the cylinder difference $X1i$ used in the flow chart in FIG. 4 by the cylinder difference $Y1i$. In step 1023, a cylinder fuel injection correction quantity is computed so as to reduce the deviation X between the air-fuel ratio of the cylinder to be corrected this time and the reference air-fuel ratio. Then, the routine proceeds to step 1024 where a cylinder fuel injection quantity is corrected on the basis of the computed cylinder fuel injection correction quantity to correct, for each cylinder, the air-fuel ratio of an air-fuel mixture to be supplied to each cylinder. This correction is performed until variations in the air-fuel ratio between cylinders become small.

According to the first embodiment described above, the cylinder difference between the actual air-fuel ratio of each cylinder and the reference air-fuel ratio (target air-fuel ratio) of the average value of air-fuel ratios of all cylinders is estimated for each cylinder with high accuracy by forcibly changing the air-fuel ratio, whereby the air-fuel ratio of each cylinder can be made equal to the reference air-fuel ratio (target air-fuel ratio) more quickly than in the prior art. Moreover, when this target air-fuel ratio is set to a stoichiometric air-fuel ratio, the air-fuel ratio of the exhaust gas in the exhaust pipe provided with the catalyst can be controlled to the stoichiometric air-fuel ratio and hence the cleaning efficiency of the exhaust gas can be improved.

Second Embodiment

Figure 6:
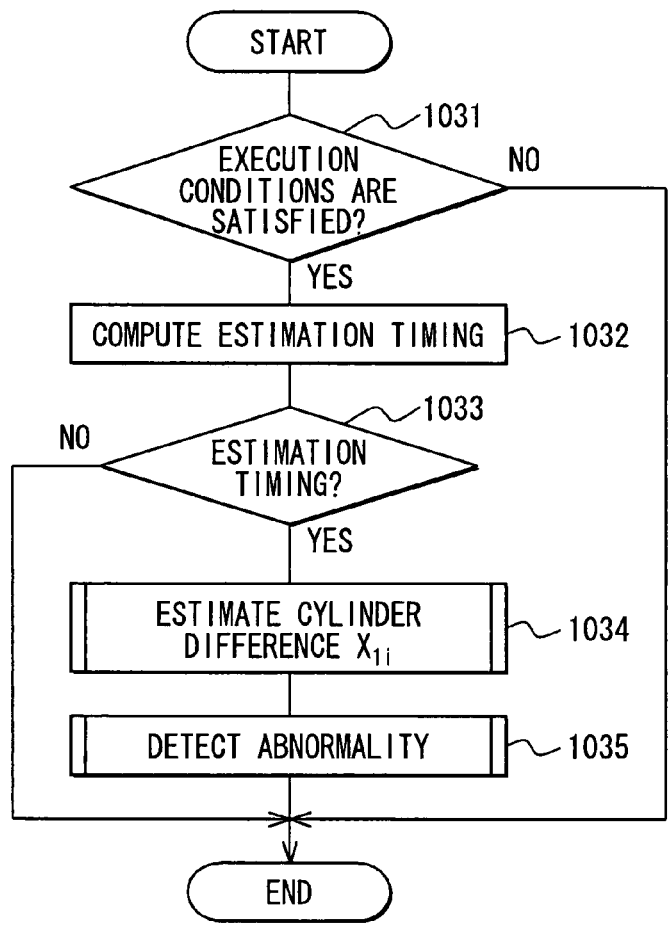
FIG. 6 is a flow chart for performing an abnormality diagnosis on the basis of the cylinder difference of the specified cylinder.

Next, another embodiment will be described with reference to FIG. 6. When the processing of this flow chart is performed, the presence or absence of abnormality caused by the time degradation or the clogging of injection port of the injector, the depositing of an EGR port, and the characteristic abnormalities of VVL and VVT can be detected by a computed deviation in the air-fuel ratio. The processing of this flow chart is performed at intervals of a specified crank angle.

When the processing of this flow chart is performed, it is determined in step 1031 whether it is a cylinder in which a cylinder difference is to be detected this time and whether the execution conditions of cylinder difference estimation determination are satisfied. Here, that the execution conditions of cylinder difference estimation determination are satisfied means, as described above, that the engine operating state is steady and that the air-fuel ratio sensor is active. It is recommendable to determine whether the engine operating state is steady, for example, by whether an intake air quantity is not larger than a predetermined value, whether an engine rotation speed is within a predetermined range, whether engine load is within a predetermined range, or whether an engine cooling water temperature is not lower than a predetermined value. When it is determined in step 1031 that it is a cylinder in which a cylinder difference is to be detected this time and that execution conditions are satisfied, the routine proceeds to step 1032 where the air-fuel ratio estimation timing of cylinder is computed on the basis of the engine rotation speed and the engine load.

When the air-fuel ratio estimation timing is computed in step 1032, the routine proceeds to step 1033 where it is determined whether this crank angle is the air-fuel ratio estimation timing. When it is determined that this crank angle is not the air-fuel ratio estimation timing, the processing of this flow chart is finished. When it is determined in step 1033 that this crank angle is the air-fuel ratio estimation timing, the routine proceeds to step 1034 where the processing of a flow chart for estimating the cylinder difference $X1i$ is performed (see FIG. 4).

When the computation of the cylinder difference $X1i$ is finished in step 1034, the processing of a subordinate flow chart of an abnormality diagnosis is performed on the basis of the cylinder difference $X1i$ of the predetermined cylinder, estimated in step 1035. By performing the processing of the subordinate flow chart, the presence or absence of abnormality caused by the time degradation and the clogging of injection port of the injector, the depositing of the EGR port, and the characteristic abnormalities of VVL and VVT is detected. When the presence or absence of abnormality is detected in step 1035, the processing of this flow chart is finished.

Figure 7:
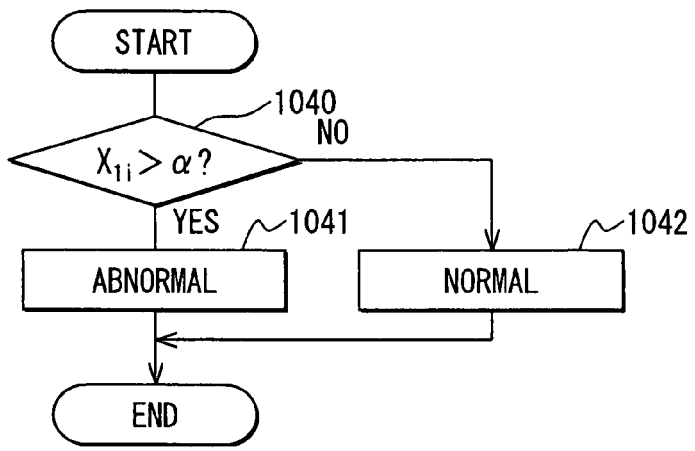
FIG. 7 is a flow chart when the abnormality diagnosis is performed.

Next, one example of the processing of detecting the presence or absence of an abnormality will be described with reference to a flow chart shown in FIG. 7. When the processing of this flow chart is performed, it is determine in step 1040 whether the computed cylinder difference $X1i$ is not smaller than a predetermined value $\alpha$. When it is determined in step 1040 that the computed cylinder difference $X1i$ is not smaller than the predetermined value $\alpha$, the routine proceeds to step 1041 where it is determined that an abnormality occurs. It can be thought that this abnormality is the time-varying deterioration and the clogging of injection port of the injector, the depositing of the EGR port, or an abnormality caused by the characteristic abnormalities of VVL and VVT. When it is determined in step 1040 that the computed cylinder difference $X1i$ is smaller than the predetermined value $\alpha$, the routine proceeds to step 1042 where it is determined that an abnormality does not occur. In other words, it is determined that the detected air-fuel ratio is different from the actual air-fuel ratio because of the shape of the exhaust pipe.

When the injection port of the injector is clogged in this manner at the time of detecting the presence or absence of an abnormality, the air-fuel ratio of only the cylinder is lean and hence the computed cylinder difference $X1i$ is thought to become an abnormal value. For this reason, it is also possible to determine that when the computed cylinder difference $X1i$ becomes larger than the predetermined value, an abnormality is caused by the clogging of the injection port of the injector.

In this embodiment, each cylinder is determined by the crank angle detected by the crank angle sensor. However, it is also recommendable to provide the exhaust cam with a protrusion so as to match the exhaust timing of each cylinder, to detect the protrusion by a cam angle sensor, and to determine each cylinder.

Third Embodiment

A third embodiment of the present invention will be described with reference to FIG. 8 to FIG. 11.

In this third embodiment, the ECU 40 estimates the air-fuel ratio of each cylinder on the basis of the detected value of the air-fuel sensor 37 by the use of a model of estimating a cylinder air-fuel ratio when the specified execution conditions of cylinder air-fuel ratio control are satisfied; the detected value being the actual air-fuel ratio of exhaust gas flowing through the exhaust gas merging section 36. Further, the ECU 40 computes a fuel correction quantity (fuel correction factor) of each cylinder according to the deviation between the estimated air-fuel ratio of each cylinder and the target air-fuel ratio. Still further, the ECU 40 corrects the fuel injection quantity of each cylinder by the use of the fuel correction quantity of each cylinder and the learned value of a cylinder air-fuel correction quantity of each cylinder, the cylinder air-fuel correction quantity being described later, to correct the variations in the air-fuel ratio between cylinders of each cylinder, thereby controlling the air-fuel ratio of each cylinder so as to be equal to the target air-fuel ratio (this control is hereinafter referred to as "cylinder air-fuel ratio control").

Further, in this third embodiment, the ECU 40 uses a period during which fuel is cut as a learning period of the cylinder air-fuel-ratio correction quantity to learn the cylinder air-fuel-ratio correction quantity for correcting variations in the air-fuel ratio between cylinders for each cylinder for four cylinders of the engine 11 in a period during which fuel is cut at the time of deceleration. Specifically, the fuel injection and the operation of opening or closing the intake valves 25 and the exhaust valves 26 are stopped except for one cylinder of four cylinders of the engine 11 in a period during which fuel is cut at the time of deceleration, and the fuel injection and the operation of opening or closing the intake valve 25 and the exhaust valve 26 are performed only for one remaining cylinder in a state in which the intake valves 25 and the exhaust valves 26 of these cylinders are closed. In the following description, the cylinder in which the fuel injection and the operation of opening or closing the intake valve 25 and the exhaust valve 26 are stopped is referred to as "stopped cylinder" and the cylinder in which the fuel injection and the operation of opening or closing the intake valve 25 and the exhaust valve 26 are performed is referred to as "operating cylinder".

Figure 8:
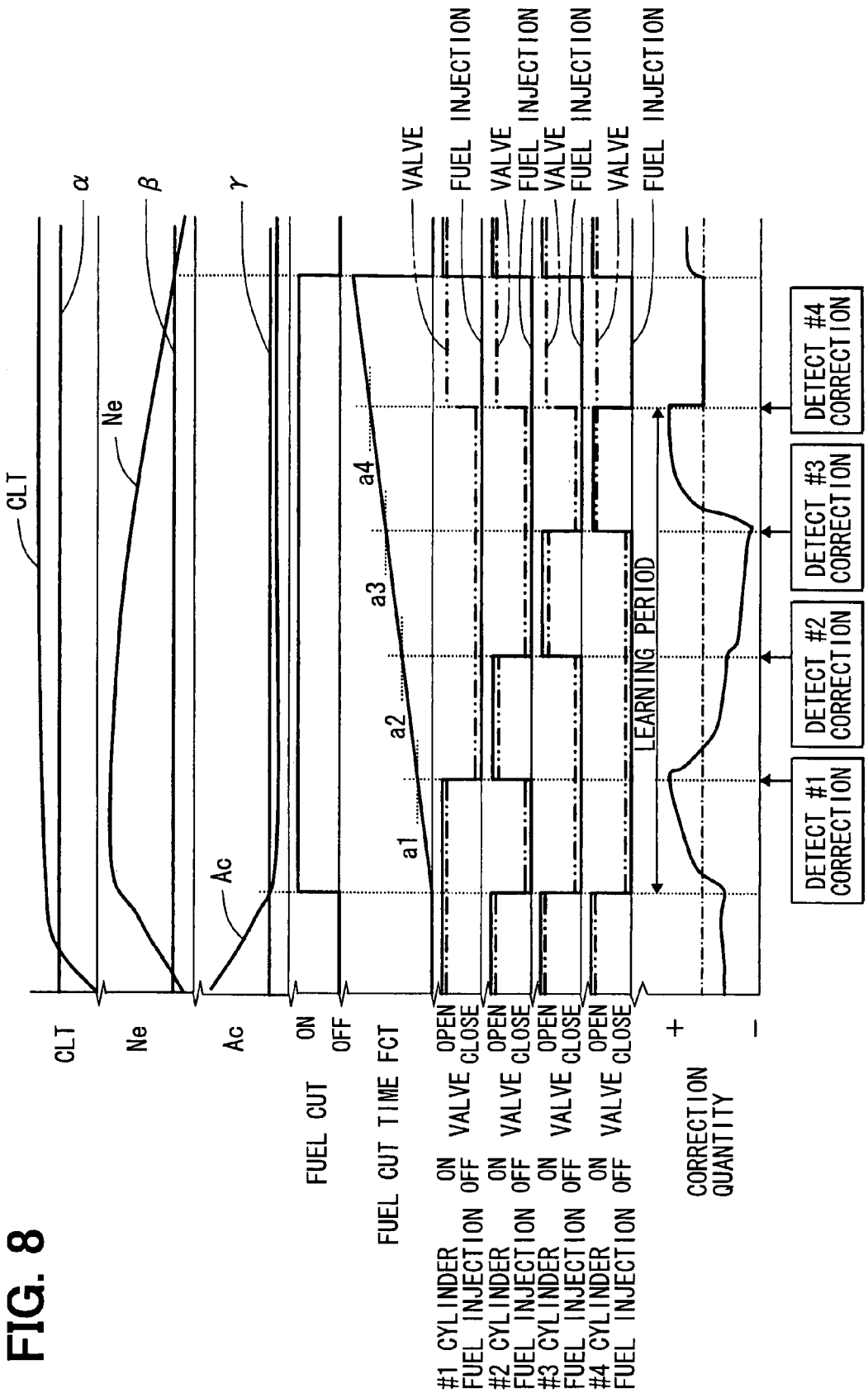
FIG. 8 is a time chart for describing a method for learning a cylinder air-fuel-ratio correction quantity of a third embodiment of the present invention.

As shown in FIG. 8, the operating cylinders are sequentially changed one by one at predetermined intervals in the period during which fuel is cut at the time of deceleration, and the air-fuel ratio of the operating cylinder is controlled to the target air-fuel ratio on the basis of the output of the air-fuel ratio sensor 37, whereby the cylinder air-fuel-ratio correction quantity is learned for each operating cylinder. In this case, all remaining cylinders except for one cylinder are brought into the stopped cylinders, and the fuel injection and the operation of opening or closing the intake valve 25 and the closing valve 26 are performed for only one operating cylinder with the intake ports and exhaust ports of these stopped cylinders closed, so the air-fuel ratio of the operating cylinder can be detected with high accuracy on the basis of the output of the air-fuel ratio sensor 37. For this reason, when the air-fuel ratio of the discharge gas of the operating cylinder is feedback controlled to the target air-fuel ratio (for example, stoichiometric air-fuel ratio) on the basis of the output of the air-fuel sensor 37, the air-fuel ratio correction quantity of the operating cylinder, set by the air-fuel ratio feedback control, becomes a cylinder air-fuel-ratio correction quantity for correcting variations in the air-fuel ratio between cylinders for the operating cylinder. Thus, when the air-fuel ratio of each of the operating cylinders is controlled to the target air-fuel ratio on the basis of the output of the air-fuel ratio sensor 37 by changing the operating cylinders sequentially one by one at predetermined intervals in the period during which fuel is cut at the time of deceleration, the cylinder air-fuel-ratio correction quantity can be learned for each operating cylinder with high accuracy. The learned value of the air-fuel ratio correction quantity is updated and stored for each cylinder in a non-volatile rewritable memory (not shown) such as backup RAM of the ECU 40.

Figure 9:
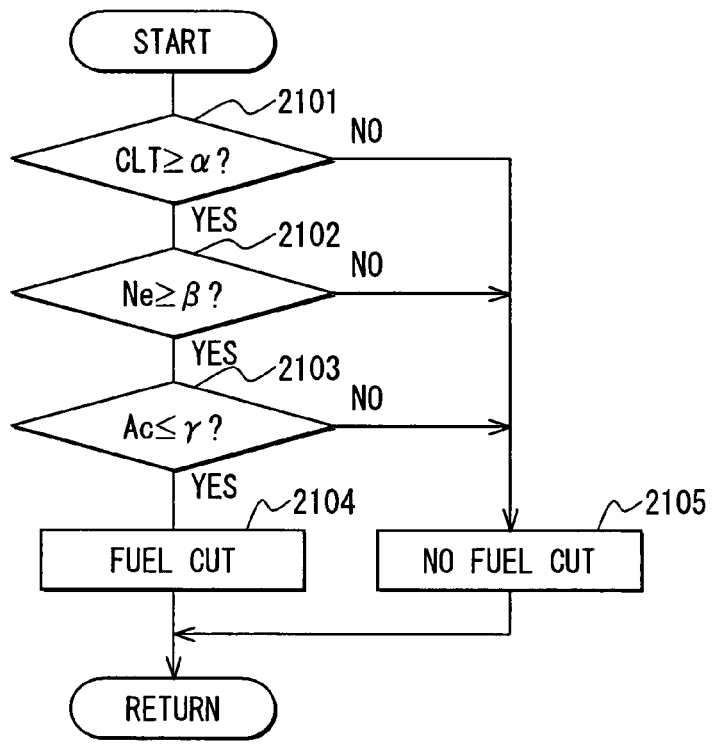
FIG. 9 is a flow chart showing the flow of processing of a routine for determining the execution conditions of fuel cut at the time of deceleration of a third embodiment of the present invention.
Figure 10:
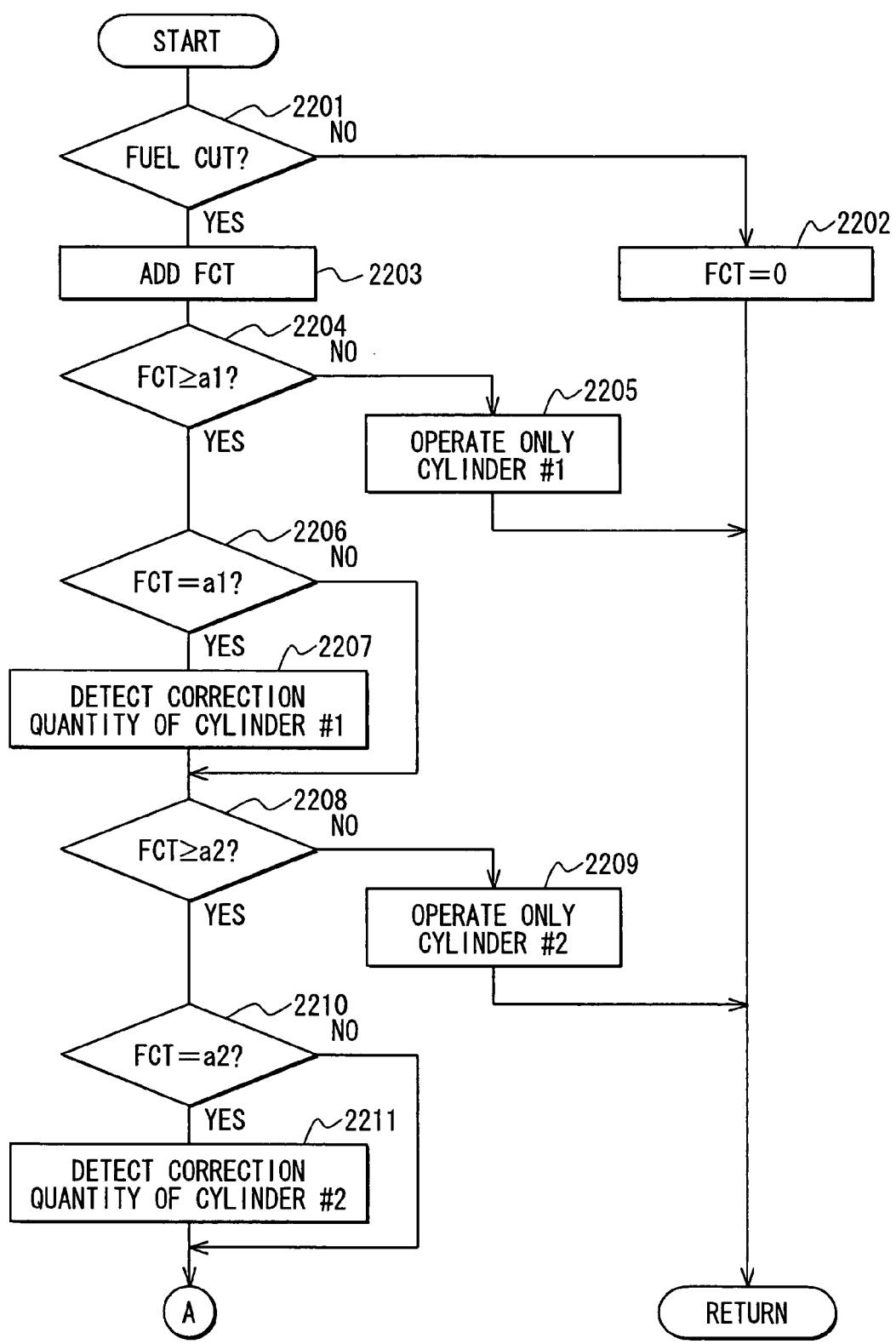
FIG. 10 is a flow chart showing the flow of processing of a routine for learning a cylinder air-fuel-ratio correction quantity of the third embodiment of the present invention.
Figure 11:
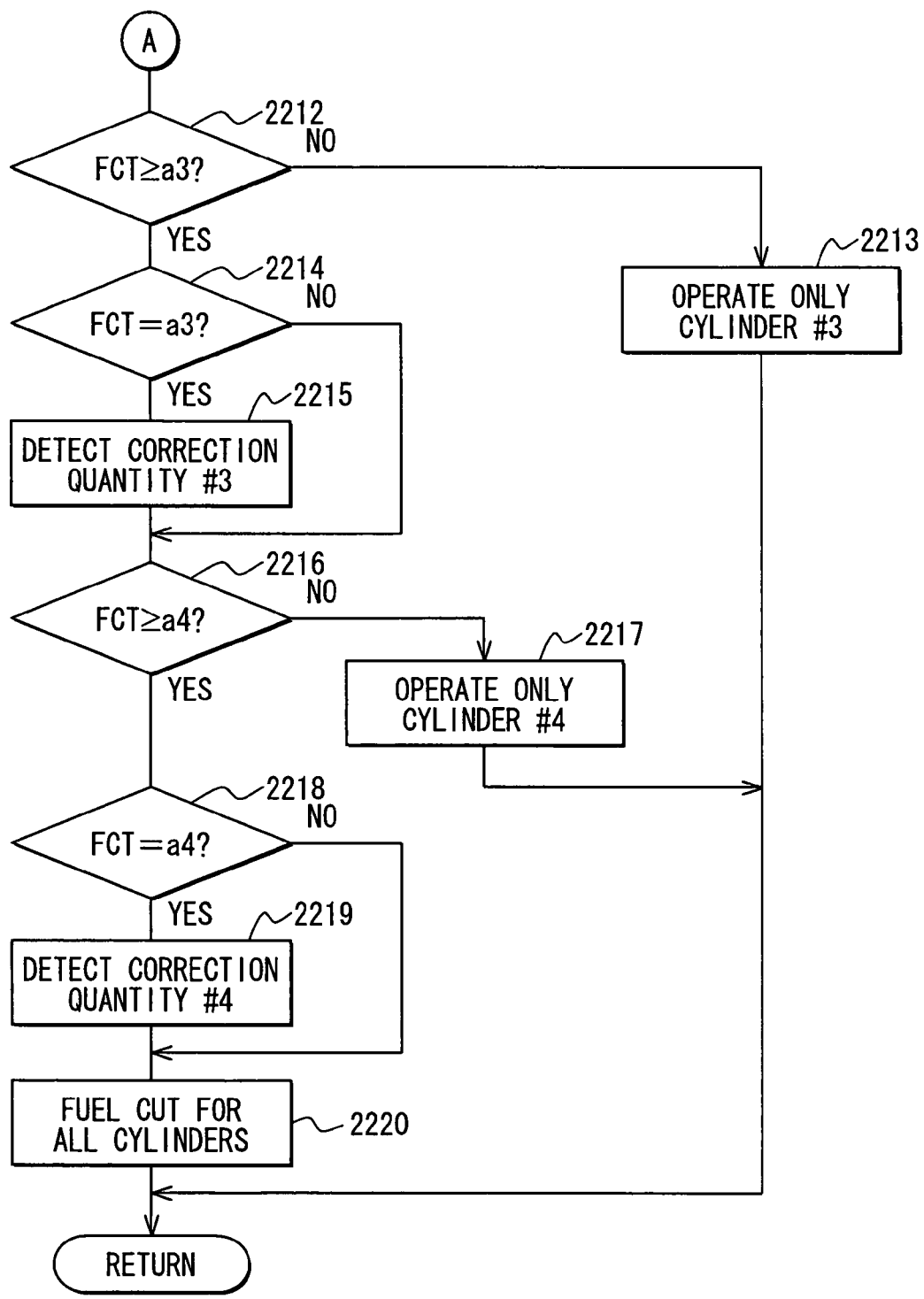
FIG. 11 is a flow chart showing the flow of processing of a routine for learning the cylinder air-fuel-ratio correction quantity of the third embodiment of the present invention.
Figure 12:
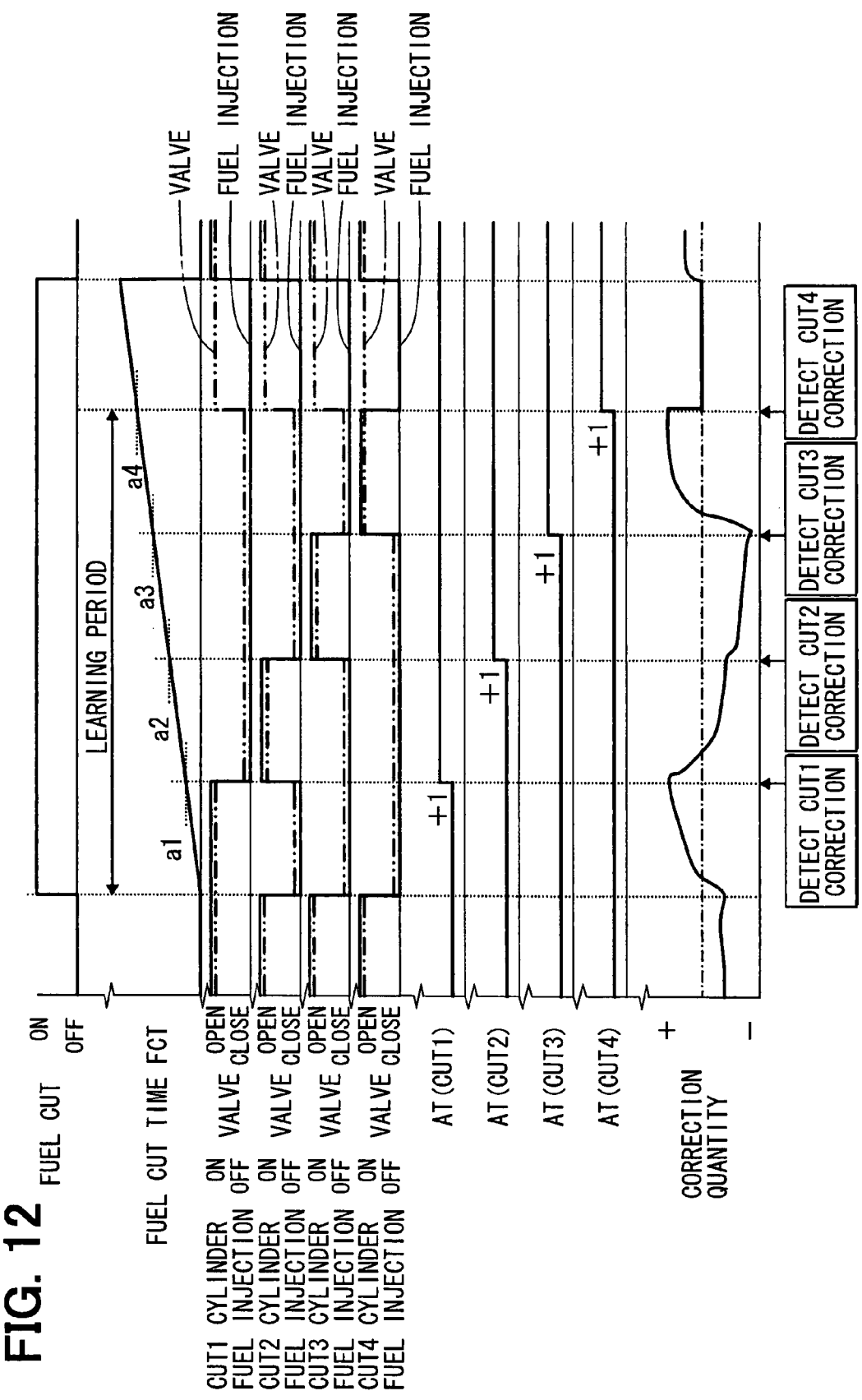
FIG. 12 is a flow chart showing the flow of processing of a routine for learning a cylinder air-fuel-ratio correction quantity of a fourth embodiment of the present invention.

The above-mentioned processing of learning the cylinder air-fuel-ratio correction quantity is performed by the ECU 40 according to the respective routines shown in FIG. 9 to FIG. 11. The processing contents of the respective routines will be described below.

A routine for determining the execution conditions of fuel cut at the time of deceleration, shown in FIG. 9, is performed by the ECU 40 at predetermined intervals in a period during which the engine is operated (an ignition switch is ON). When this routine is started, in steps 2101 to 2103, whether the execution conditions of fuel cut at the time of deceleration are satisfied is determined by whether all of the following conditions (1) to (3) are satisfied.

(1) A cooling water temperature CLT is not lower than a predetermined value α (engine idling determination temperature) (step 2101).
(2) An engine rotation speed Ne is not smaller than a predetermined value β (fuel cut return rotation speed) (step 2102).
(3) An accelerator depression Ac is not larger than a predetermined value γ (accelerator is totally closed (step 2103).

When at least one of these three conditions (1) to (3) is not satisfied (in other words, a determination result in any one of steps 2101 to 2103 is NO), the execution conditions of fuel cut at the time of deceleration are not satisfied and the routine proceeds to step 2105 where fuel cut at the time of deceleration is prohibited.

In contrast to this, all of the three conditions (1) to (3) are satisfied (in other words, all determination results in all of steps 2101 to 2103 are YES), the execution conditions of fuel cut at the time of deceleration are satisfied and the routine proceeds to step 2104 where fuel cut at the time of deceleration is performed.

The routine for learning the cylinder air-fuel-ratio correction quantity, shown in FIG. 10 and FIG. 11, is executed at predetermined intervals during a period in which the engine is operated (during a period in which the ignition switch is ON). When this routine is started, it is determined first in step 2201 whether fuel cut at the time of deceleration is being performed (whether it is a period during which a cylinder air-fuel-ratio correction quantity is learned). When the fuel cut at the time of deceleration is not being performed, the routine proceeds to step 2202 where a fuel cut time counter for counting an elapsed time FCT that elapses from the start of the fuel cut at the time of deceleration is initialized to make FCT=0 and this routine is finished.

When it is determined in the step 2201 that fuel cut at the time of deceleration is being performed, the routine proceeds step 2203 where the cycle time of starting this routine is added to the elapsed time FCT that elapses after the fuel cut at the time of deceleration is started until the last computation is performed to find an elapsed time FCT that elapses after the fuel cut at the time of deceleration is started until this computation is performed (hereinafter referred simply to as "fuel cut time").

Then, the routine proceeds to step 2204 where it is determined whether the fuel cut time FCT becomes not smaller than a predetermined value a1. When the fuel cut time FCT does not yet become not smaller than the predetermined value a1, the routine proceeds to step 2205 where the only cylinder #1 is brought to an operating cylinder and where three remaining cylinders are brought to stopped cylinders. The fuel injection and the operation of opening or closing the intake valve 25 and the exhaust valve 26 are performed only for the one operating cylinder (cylinder #1) with the intake valves and exhaust valves of the three remaining stopped cylinders closed. For this operating cylinder (cylinder #1), the air-fuel ratio of exhaust gas of the operating cylinder (cylinder #1) is feedback controlled to the target air-fuel ratio (for example, stoichiometric air-fuel ratio) on the basis of the output of the air-fuel ratio sensor 37.

On the other hand, when it is determined in step 2204 that the fuel cut time FCT is not smaller than the predetermined value a1, the routine proceeds to step 2206 where it is determined whether the fuel cut time FCT is the predetermined value a1. Only when the fuel cut time FCT is the predetermined value a1, the routine proceeds to step 2207 where the cylinder air-fuel-ratio correction quantity of the operating cylinder (cylinder #1) at that time (air-fuel ratio correction quantity by the air-fuel ratio feedback control at that time) is detected. Then, this cylinder air-fuel-ratio correction quantity of the operating cylinder (cylinder #1) is updated and stored as the learned value of the cylinder air-fuel-ratio correction quantity in the rewritable non-volatile memory of the ECU 40. The processing of this step 2207 is executed once only when the fuel cut time FCT reaches the predetermined value a1 and thereafter is skipped.

Thereafter, the routine proceeds to step 2208 where it is determined whether the fuel cut time FCT becomes not smaller than a predetermined value a2 (=a1+a predetermined time). When the fuel cut time FCT does not become not smaller than the predetermined value a2, the routine proceeds to step 2209 where only cylinder #2 is brought to an operating cylinder and three remaining cylinders are brought to stopped cylinders. The fuel injection and the opening of the intake valve 25 and the exhaust valve 26 of the only one operating cylinder (cylinder #2) are performed with the intake valves 25 and the exhaust valves 26 of the three remaining stopped cylinders closed. For the operating cylinder (cylinder #2), the air-fuel ratio of exhaust gas of the operating cylinder (cylinder #2) is feedback controlled to the target air-fuel ratio (for example, stoichiometric air-fuel ratio) on the basis of the output of the air-fuel ratio sensor 37.

On the other hand, when it is determined in step 2208 that the fuel cut time FCT is not smaller than the predetermined value a2, the routine proceeds to step 2210 where it is determined whether the fuel cut time FCT is the predetermined value a2. Only when the fuel cut time FCT is the predetermined value a2, the routine proceeds to step 2211 where the cylinder air-fuel-ratio correction quantity of the operating cylinder (cylinder #2) at that time is detected. Then, this cylinder air-fuel-ratio correction quantity of the operating cylinder (cylinder #2) is updated and stored in the rewritable non-volatile memory of the ECU 40. The processing of this step 2211 is executed once only when the fuel cut time FCT reaches the predetermined value a2 and thereafter is skipped.

Thereafter, the routine proceeds to step 2211 in FIG. 11 where it is determined whether the fuel cut time FCT becomes not smaller than a predetermined value a3 (=a2+a predetermined time). When the fuel cut time FCT does not become not smaller than the predetermined value a3, the routine proceeds to step 2213 where only cylinder #3 is brought to an operating cylinder and three remaining cylinders are brought to stopped cylinders. The fuel injection and the opening of the intake valve 25 and the exhaust valve 26 of the only one operating cylinder (cylinder #3) are performed with the intake valves 25 and the exhaust valves 26 of the three remaining stopped cylinders closed. For the operating cylinder (cylinder #3), the air-fuel ratio of exhaust gas of the operating cylinder (cylinder #3) is feedback controlled to the target air-fuel ratio (for example, stoichiometric air-fuel ratio) on the basis of the output of the air-fuel ratio sensor 37.

On the other hand, when it is determined in step 2212 that the fuel cut time FCT is not smaller than the predetermined value a3, the routine proceeds to step 2214 where it is determined whether the fuel cut time FCT is the predetermined value a3. Only when the fuel cut time FCT is the predetermined value a3, the routine proceeds to step 2215 where the cylinder air-fuel-ratio correction quantity of the operating cylinder (cylinder #3) at that time is detected. Then, this cylinder air-fuel-ratio correction quantity of the operating cylinder (cylinder #3) is updated and stored in the rewritable non-volatile memory of the ECU 40. The processing of this step 2215 is executed once only when the fuel cut time FCT reaches the predetermined value a3 and thereafter is skipped.

Thereafter, the routine proceeds to step 2216 where it is determined whether the fuel cut time FCT becomes not smaller than a predetermined value a4 (=a3+a predetermined time). When the fuel cut time FCT does not become not smaller than the predetermined value a4, the routine proceeds to step 2217 where only cylinder #4 is brought to an operating cylinder and three remaining cylinders are brought to stopped cylinders. The fuel injection and the opening of the intake valve 25 and the exhaust valve 26 of the only one operating cylinder (cylinder #4) are performed with the intake valves 25 and the exhaust valves 26 of the three remaining stopped cylinders closed. For the operating cylinder (cylinder #4), the air-fuel ratio of exhaust gas of the operating cylinder (cylinder #4) is feedback controlled to the target air-fuel ratio (for example, stoichiometric air-fuel ratio) on the basis of the output of the air-fuel ratio sensor 37.

On the other hand, when it is determined in step 2216 that the fuel cut time FCT is not smaller than the predetermined value a4, the routine proceeds to step 2218 where it is determined whether the fuel cut time FCT is the predetermined value a4. Only when the fuel cut time FCT is the predetermined value a4, the routine proceeds to step 2219 where the cylinder air-fuel-ratio correction quantity of the operating cylinder (cylinder #4) at that time is detected. Then, this cylinder air-fuel-ratio correction quantity of the operating cylinder (cylinder #4) is updated and stored in the rewritable non-volatile memory of the ECU 40. The processing of this step 2219 is executed once only when the fuel cut time FCT reaches the predetermined value a4. Thereafter, it is determined that the period of learning the air-fuel ratio correction quantity is finished and the routine proceeds to step 2220 where the fuel injection is cut for all cylinders, that is, fuel cut at the time of deceleration is performed.

According to this third embodiment described above, by changing the operating cylinder sequentially one by one at predetermined intervals during the period in which the fuel cut at the time of deceleration is performed, the air-fuel ratio of each operating cylinder is controlled to the target air-fuel ratio on the basis of the output of the air-fuel ratio sensor 37 and the cylinder air-fuel-ratio correction quantity are learned for each operating cylinder. Thus, the cylinder air-fuel-ratio correction quantity can be learned with high accuracy and hence variations in air-fuel ratio between cylinders can be corrected from these learned values with high accuracy and the cylinder air-fuel ratio control can be performed with high accuracy.

In addition, in this third embodiment, the learned values of the cylinder air-fuel-ratio correction quantity are stored in the rewritable non-volatile memory. Hence, the learned values of the air-fuel ratio correction quantity can be held stored even during a period in which the engine is stopped (during a period in which the ignition switch is OFF), and just after the next start of the engine, variations in the air-fuel ratio between cylinders can be corrected with high accuracy by the use of the air-fuel ratio correction quantity learned in the past.

Moreover, in this third embodiment, the cylinder air-fuel-ratio correction quantity is learned by using the period during which the fuel cut at the time of deceleration is performed as the learning period of the cylinder air-fuel-ratio correction quantity. Thus, this third embodiment has the advantage of learning the cylinder air-fuel-ratio correction quantity without degrading drivability.

In this regard, in an engine in which only part of the cylinders is operated with other cylinders stopped depending on the operating conditions, the cylinder air-fuel-ratio correction quantity may be learned in a period during which parts of the cylinders are stopped. Alternatively, in a hybrid electric automobile, the cylinder air-fuel-ratio correction quantity may be learned in a period during which the vehicle is moved by the power of the motor (engine is stopped).

Moreover, in this third embodiment, the learning of the cylinder air-fuel-ratio correction quantity is started always from the same cylinder (cylinder #1) after the fuel cut at the time of deceleration is started. However, the learning of the cylinder air-fuel-ratio correction quantity may be started from a cylinder for which the cylinder air-fuel-ratio correction quantity cannot be learned in the last learning period. Alternatively, the cylinder from which the learning of the cylinder air-fuel-ratio correction quantity is started may be changed at random.

Furthermore, in this third embodiment, both of the intake valves 25 and the exhaust valves 26 of the stopped cylinders are closed during the period in which the cylinder air-fuel-ratio correction quantity is learned. However, it is also recommendable to close only one of the intake valve 25 and the exhaust valve 26 of each stopped cylinder and to open or close the other valves as usual. The bottom line is that it suffices to close at least one of the intake valve 25 and the exhaust valve 26 of each of the stopped cylinders in the period during which the cylinder air-fuel-ratio correction quantity is learned to thereby to prevent intake air from flowing into the exhaust manifold 35 through the stopped cylinders. In this case, when the exhaust valves 26 of the stopped cylinders are electromagnetically operated valves like this third embodiment, it is preferable that the exhaust valves 26 are closed to prevent remaining gas in the stopped cylinders from flowing into the exhaust manifold 35. With this, the air-fuel ratio of the exhaust gas in the operating cylinder can be detected by the air-fuel ratio sensor 37 with high accuracy without undergoing the effect of exhaust gas from the stopped cylinders.

Fourth Embodiment

When the learning of the cylinder air-fuel-ratio correction quantity is started always from the same cylinder at the time of learning the cylinder air-fuel-ratio correction quantity of a plurality of cylinders, when the period of learning is short, there may be a case in which the cylinder air-fuel-ratio correction quantity cannot be learned for some cylinder in the period of learning. Therefore, there is a possibility that the frequency of learning of each cylinder is varied to reduce the accuracy of learning.

Thus, in a fourth embodiment of the invention shown in FIG. 12 to FIG. 15, the frequency of learning (the number of detections) of the cylinder air-fuel-ratio correction quantity of each cylinder is counted by a number-of-detection counter and is stored in the rewritable non-volatile memory of the ECU 40. The cylinder air-fuel-ratio correction quantity is learned in sequence in the order in which the frequency of learning (the number of detections) increase in the period during which the cylinder air-fuel-ratio correction quantity is learned. The processing contents of the respective routines executed in this fourth embodiment and shown in FIG. 13 to FIG. 15 will be described.

Figure 13:
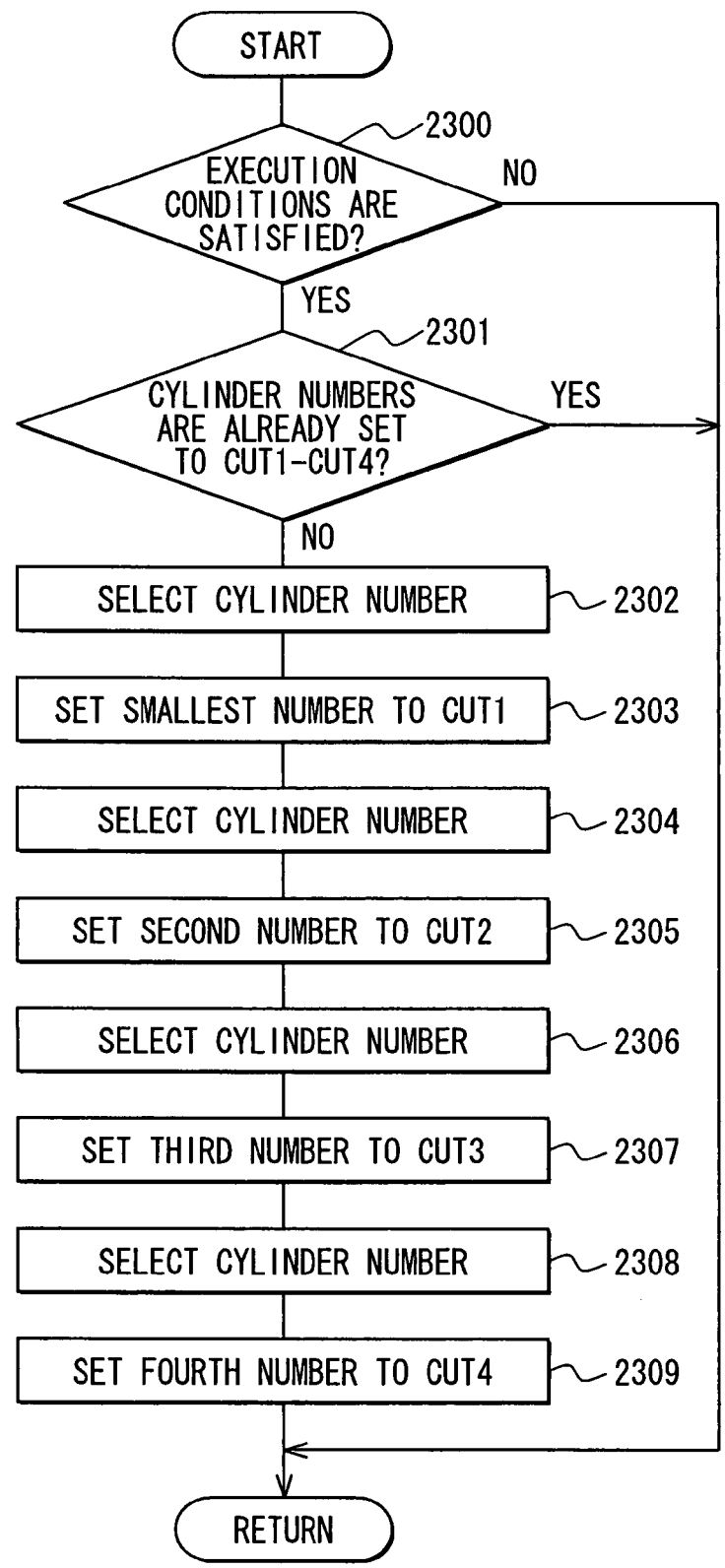
FIG. 13 is a flow chart showing the flow of processing of a routine for determining the order of learning of cylinders of the fourth embodiment of the present invention.

The routine for determining the order of learning of cylinders, shown in FIG. 13, is executed at predetermined intervals in a period during which the engine is operated (the ignition switch is ON). When this routine is started, it is determined first in step 2300 whether execution conditions of the fuel cut at the time of deceleration are satisfied. When the execution conditions of the fuel cut at the time of deceleration are not satisfied, this routine is finished without executing the following processing.

When it is determined in step 2300 that the execution conditions of the fuel cut at the time of deceleration are satisfied, the routine proceeds to step 2301 where it is determined whether cylinder numbers are already set to first to fourth cylinder numbers CUT1 to CUT4 for determining the order of cylinder for which the air-fuel ratio correction quantity is learned (detected). When the cylinder numbers are already set, the routine is finished without performing any processing. When the cylinder numbers are not set, the routine proceeds to step 2302 where a cylinder number in which the number of detections is the smallest is selected from number-of-detection counters AT (#) for counting the number of detections of the air-fuel ratio correction quantity of each cylinder. In the next step 2303, a cylinder number for which the number of detections is the smallest is set to the first cylinder number CUT1 denoting a cylinder to be first learned. In this regard, AT (#) denotes any one of AT(CUT1), AT(CUT2), AT(CUT3), and AT(CUT4).

Thereafter, the routine proceeds to step 2304 where a cylinder number in which the number of detections is second to a minimum value is selected from the number-of-detection counters AT (#) of the respective cylinders. In step 2305, the cylinder number in which the number of detections is second to the minimum value is set to the second cylinder number CUT2 denoting a cylinder to be learned second.

Thereafter, the routine proceeds to step 2306 where a cylinder number in which the number of detections is third to the minimum value is selected from the number-of-detection counters AT (#) of the respective cylinders. In step 2307, the cylinder number in which the number of detections is third to the minimum value is set to the third cylinder number CUT3 denoting a cylinder to be learned third.

Thereafter, the routine proceeds to step 2308 where a cylinder number in which the number of detections is fourth to the minimum value is selected from the number-of-detection counters AT (#) of the respective cylinders. In step 2309, the cylinder number in which the number of detections is fourth to the minimum value is set to the fourth cylinder number CUT4 denoting a cylinder to be learned fourth and then this routine is finished.

Figure 14:
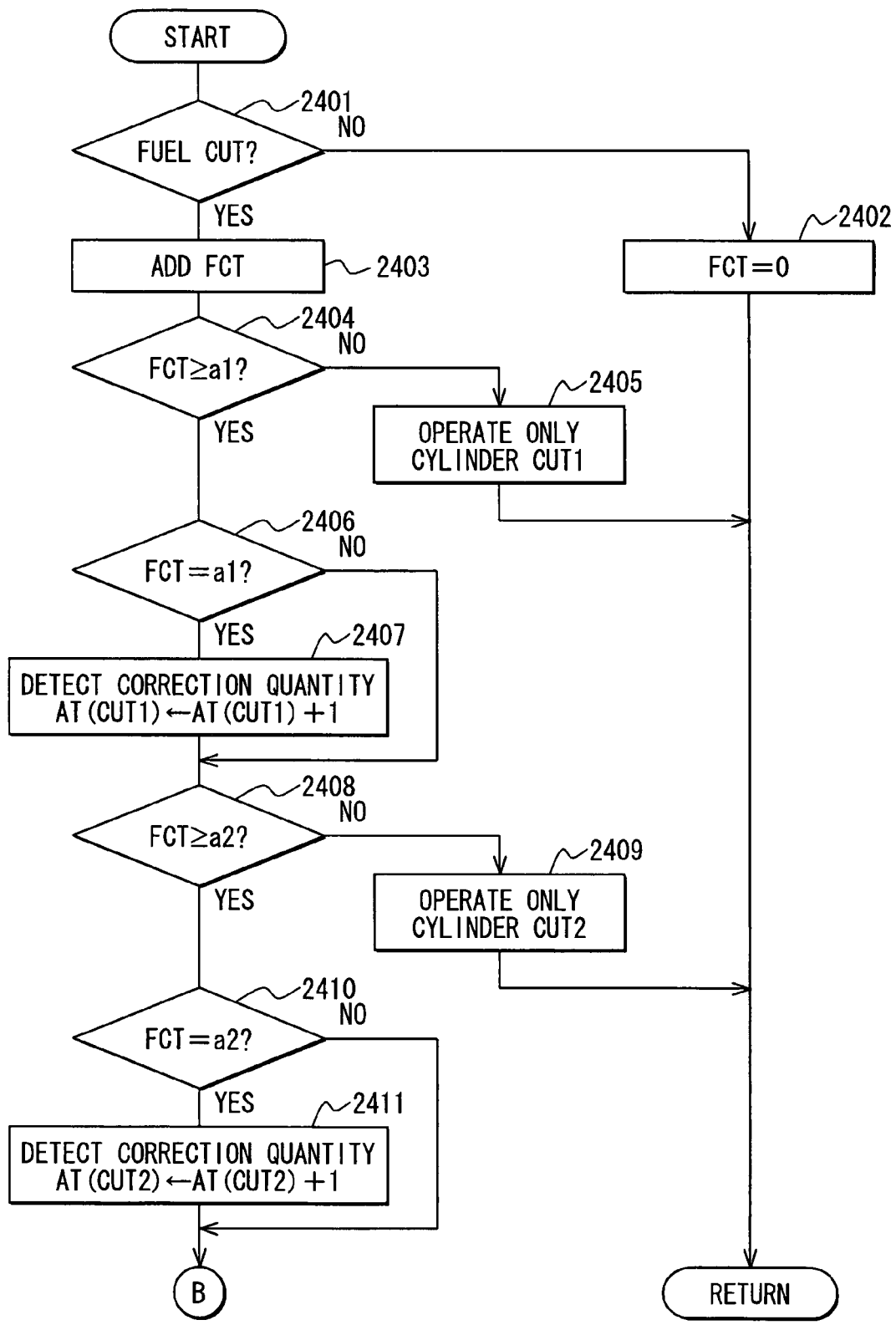
FIG. 14 is a flow chart showing the flow of processing of a routine for learning a cylinder air-fuel-ratio correction quantity of the fourth embodiment of the present invention.
Figure 15:
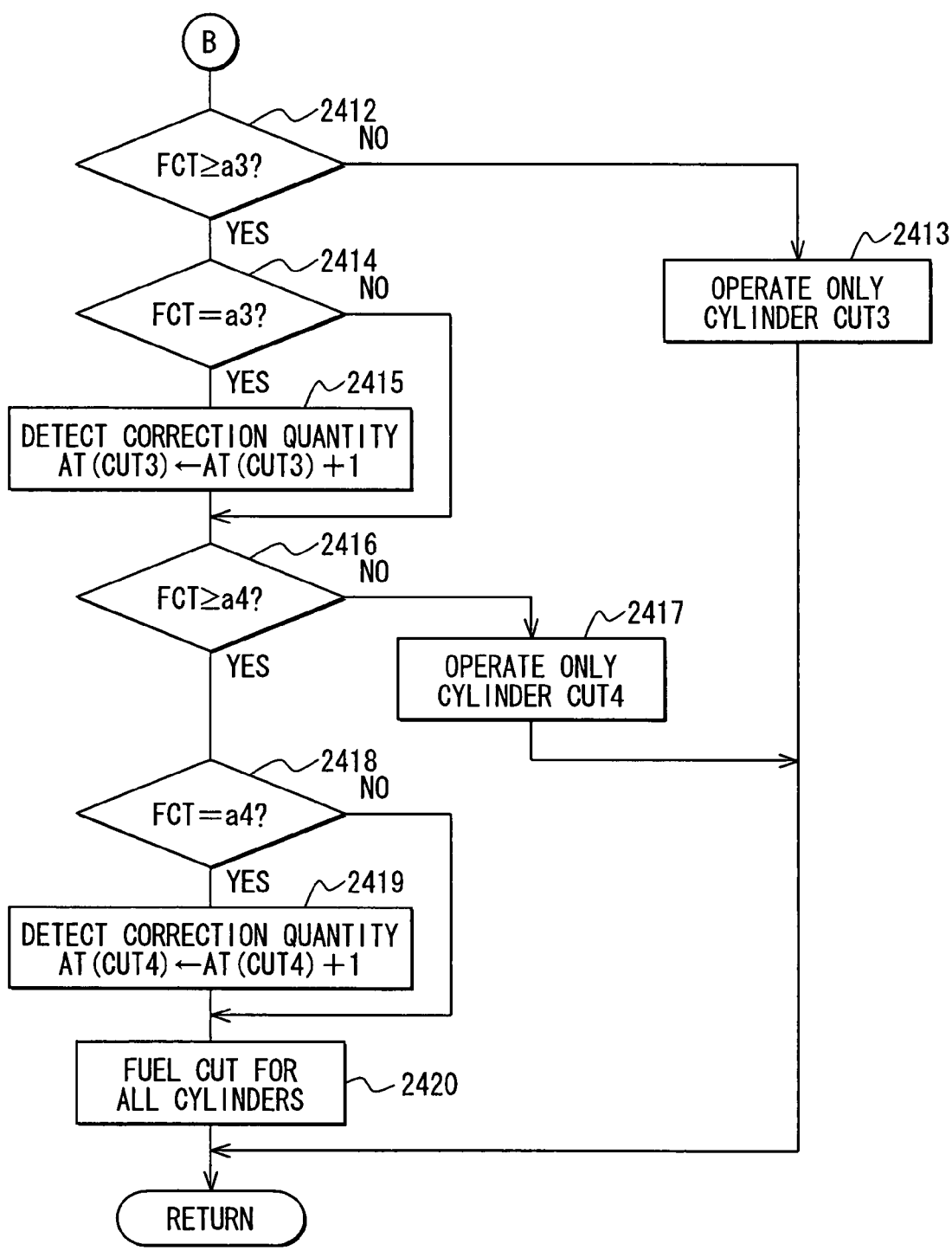
FIG. 15 is a flow chart showing the flow of processing of a routine for learning the cylinder air-fuel-ratio correction quantity of the fourth embodiment of the present invention.

The routine for learning a cylinder air-fuel correction quantity, shown in FIG. 14 and FIG. 15, is executed by the ECU 40 at predetermined intervals in the period during which the engine is operated (the ignition switch is ON). When this routine is started, it is determined in step 2401 whether the fuel cut at the time of deceleration is being performed (whether a cylinder air-fuel correction quantity is being learned). When the fuel cut at the time of deceleration is not being performed, the routine proceeds to step 2402 where the fuel cut time counter for counting an elapsed time FCT that elapses after the fuel cut at the time of deceleration is started is initialized to make FCT=0 and then this routine is finished.

When it is determined in step 2401 that the fuel cut at the time of deceleration is being performed, the routine proceeds to step 2403 where the cycle time of starting this routine is added to an elapsed time FCT that elapses after the fuel cut at the time of deceleration is started until the last computation is performed to find an elapsed time (hereinafter referred simply to as "fuel cut time") FCT that elapses after the fuel cut at the time of deceleration is started until this computation is performed.

Then, the routine proceeds to step 2404 where it is determined whether the fuel cut time FCT becomes not smaller than the predetermined value a1. When the fuel cut time FCT does not yet become not smaller than the predetermined value a1, the routine proceeds to step 2405 where only a cylinder CUT1 in which the number of detections of the cylinder air-fuel-ratio correction quantity is minimum is brought to an operating cylinder and where three remaining cylinders are brought to stopped cylinders. Then, like the third embodiment, the air-fuel ratio of exhaust gas of the cylinder CUT1 is feedback controlled to the target air-fuel ratio (for example, stoichiometric air-fuel ratio) on the basis of the output of the air-fuel ratio sensor 37.

On the other hand, when it is determined in step 2404 that the fuel cut time FCT is not smaller than the predetermined value a1 or more, the routine proceeds to step 2406 where it is determined whether the fuel cut time FCT is the predetermined value a1. Only when the fuel cut time FCT is the predetermined value a1, the routine proceeds to step 2407 where the cylinder air-fuel-ratio correction quantity of the operating cylinder (cylinder CUT1) at that time is detected. Then, this cylinder air-fuel-ratio correction quantity of the operating cylinder (cylinder CUT1) is updated and stored in the rewritable non-volatile memory of the ECU 40 and the number-of-detection counter AT(CUT1) of the cylinder CUT1 is counted up and stored in the nonvolatile memory. The processing of this step 2407 is executed once only when the fuel cut time FCT reaches the predetermined value a1 and thereafter is skipped.

Then, the routine proceeds to step 2408 where it is determined whether the fuel cut time FCT becomes not smaller than the predetermined value a2 (=a1+a predetermined value). When the fuel cut time FCT does not yet become not smaller than the predetermined value a2, the routine proceeds to step 2409 where only a cylinder CUT2 in which the number of detections of the cylinder air-fuel-ratio correction quantity is second to a minimum value is brought to an operating cylinder and where three remaining cylinders are brought to stopped cylinders. Then, the air-fuel ratio of exhaust gas of the cylinder CUT2 is feedback controlled to the target air-fuel ratio (for example, stoichiometric air-fuel ratio) on the basis of the output of the air-fuel ratio sensor 37.

On the other hand, when it is determined in step 2408 that the fuel cut time FCT is not smaller than the predetermined value a2, the routine proceeds to step 2410 where it is determined whether the fuel cut time FCT is the predetermined value a1. Only when the fuel cut time FCT is the predetermined value a2, the routine proceeds to step 2411 where the cylinder air-fuel-ratio correction quantity of the operating cylinder (cylinder CUT2) at that time is detected. Then, this cylinder air-fuel-ratio correction quantity of the operating cylinder (cylinder CUT2) is updated and stored in the rewritable non-volatile memory of the ECU 40, and the number-of-detection counter AT(CUT2) of the cylinder CUT2 is counted up and stored in the nonvolatile memory. The processing of this step 2411 is executed once only when the fuel cut time FCT reaches the predetermined value a2 and thereafter is skipped.

Then, the routine proceeds to step 2412 where it is determined whether the fuel cut time FCT becomes not smaller than the predetermined value a3 (=a2+a predetermined value). When the fuel cut time FCT does not yet become not smaller than the predetermined value a3, the routine proceeds to step 2413 where only a cylinder CUT3 in which the number of detections of the cylinder air-fuel-ratio correction quantity is third to the minimum value is brought to an operating cylinder and where three remaining cylinders are brought to stopped cylinders. Then, the air-fuel ratio of exhaust gas of the cylinder CUT3 is feedback controlled to the target air-fuel ratio (for example, stoichiometric air-fuel ratio) on the basis of the output of the air-fuel ratio sensor 37.

When it is determined in step 2412 that the fuel cut time FCT is not smaller than the predetermined value a3, the routine proceeds to step 2414 where it is determined whether the fuel cut time FCT is the predetermined value a3. Only when the fuel cut time FCT is the predetermined value a2, the routine proceeds to step 2415 where the cylinder air-fuel-ratio correction quantity of the operating cylinder (cylinder CUT3) at that time is detected. Then, this cylinder air-fuel-ratio correction quantity of the operating cylinder (cylinder CUT3) is updated and stored in the rewritable non-volatile memory of the ECU 40, and the number-of-detection counter AT(CUT3) of the cylinder CUT3 is counted up and stored in the nonvolatile memory. The processing of this step 2415 is executed once only when the fuel cut time FCT reaches the predetermined value a3 and thereafter is skipped.

Then, the routine proceeds to step 2416 where it is determined whether the fuel cut time FCT becomes not smaller than the predetermined value a4 (=a3+a predetermined value). When the fuel cut time FCT does not yet become not smaller than the predetermined value a4, the routine proceeds to step 2417 where only a cylinder CUT4 in which the number of detections of the cylinder air-fuel-ratio correction quantity is fourth to the minimum value is brought to an operating cylinder and where three remaining cylinders are brought to stopped cylinders. Then, the air-fuel ratio of discharge gas of the cylinder CUT4 is feedback controlled to the target air-fuel ratio (for example, stoichiometric air-fuel ratio) on the basis of the output of the air-fuel ratio sensor 37.

On the other hand, when it is determined in step 2416 that the fuel cut time FCT becomes not smaller than the predetermined value a4, the routine proceeds to step 2418 where it is determined whether the fuel cut time FCT is the predetermined value a4. Only when the fuel cut time FCT is the predetermined value a4, the routine proceeds to step 2419 where the cylinder air-fuel-ratio correction quantity of the operating cylinder (cylinder CUT4) at that time is detected. Then, this cylinder air-fuel-ratio correction quantity of the operating cylinder (cylinder CUT4) is updated and stored in the rewritable non-volatile memory of the ECU 40, and the number-of-detection counter AT(CUT4) of the cylinder CUT4 is counted up and stored in the nonvolatile memory. The processing of this step 2411 is executed once only when the fuel cut time FCT reaches the predetermined value a4. Thereafter, it is determined that the period in which the air-fuel ratio correction quantity is learned is finished and the routine proceeds to step 2420 where the fuel injection is cut for all cylinders, that is, the fuel cut at the time of deceleration is performed.

According to this fourth embodiment described above, the frequency of learning (the number of detections) of the cylinder air-fuel-ratio correction quantity of each cylinder is counted and the cylinder air-fuel-ratio correction quantity is learned in the order in which the frequency of learning (the number of detections) increases during a period in which the cylinder air-fuel-ratio correction quantity is learned. So, even if the period in which the cylinder air-fuel-ratio correction quantity is learned is short, the cylinder air-fuel-ratio correction quantity can be learned at a nearly equal frequency for all cylinders. Accordingly, the fourth embodiment has the advantage of improving the accuracy of learning.

Fifth Embodiment

In the foregoing third and fourth embodiments, while the cylinder air-fuel-ratio correction quantity is learned, the operating cylinders are changed one by one to learn the cylinder air-fuel-ratio correction quantity. However, in a fifth embodiment shown in FIG. 16 to FIG. 18, while the cylinder air-fuel-ratio correction quantity is learned, the number of the operating cylinders is sequentially decreased to learn the cylinder air-fuel-ratio correction quantity.

Figure 16:
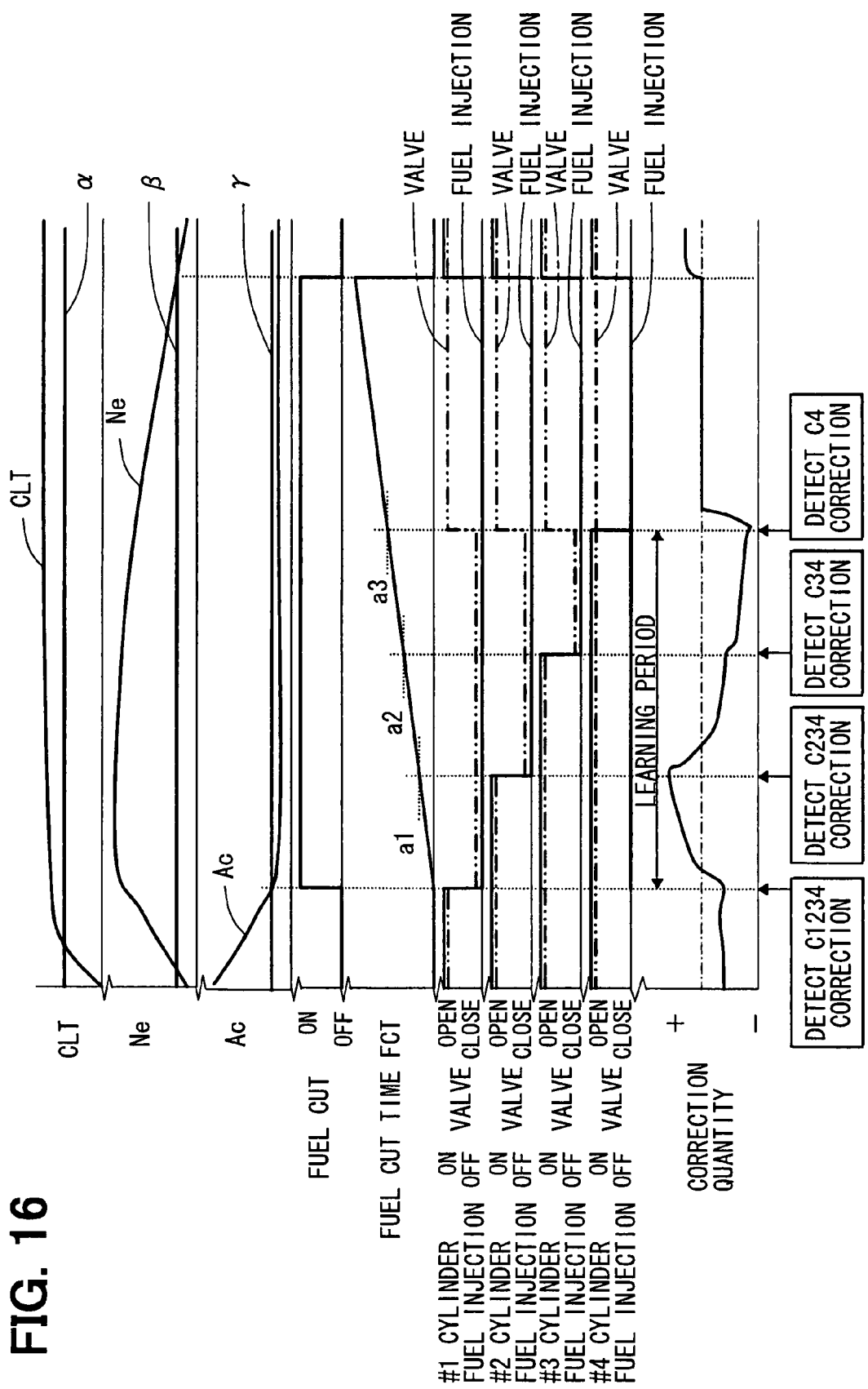
FIG. 16 is a time chart for describing a method for learning a cylinder air-fuel-ratio correction quantity of a fifth embodiment of the present invention.

Specifically, as shown in FIG. 16, when the period of the fuel cut at the time of deceleration (the period during which the cylinder air-fuel-ratio correction quantity is learned) is started, an air-fuel-ratio correction quantity when all cylinders are operated is detected in advance, and then the number of the operating cylinders is decreased one by one at predetermined intervals and the air-fuel-ratio correction quantity of all operating cylinders is detected every time the number of the operating cylinders is decreased. Finally, when the number of operating cylinders is decreased to one, the air-fuel-ratio correction quantity of the operating cylinder is detected. Then, the cylinder air-fuel-ratio correction quantities of the other cylinders are computed sequentially from this air-fuel-ratio correction quantity of the operating cylinder and the detected data of the air-fuel-ratio correction quantity when all cylinders are operated is detected. The processing contents of the respective routines executed in this fifth embodiment and shown in FIG. 17 and FIG. 18 will be described below.

Figure 17:
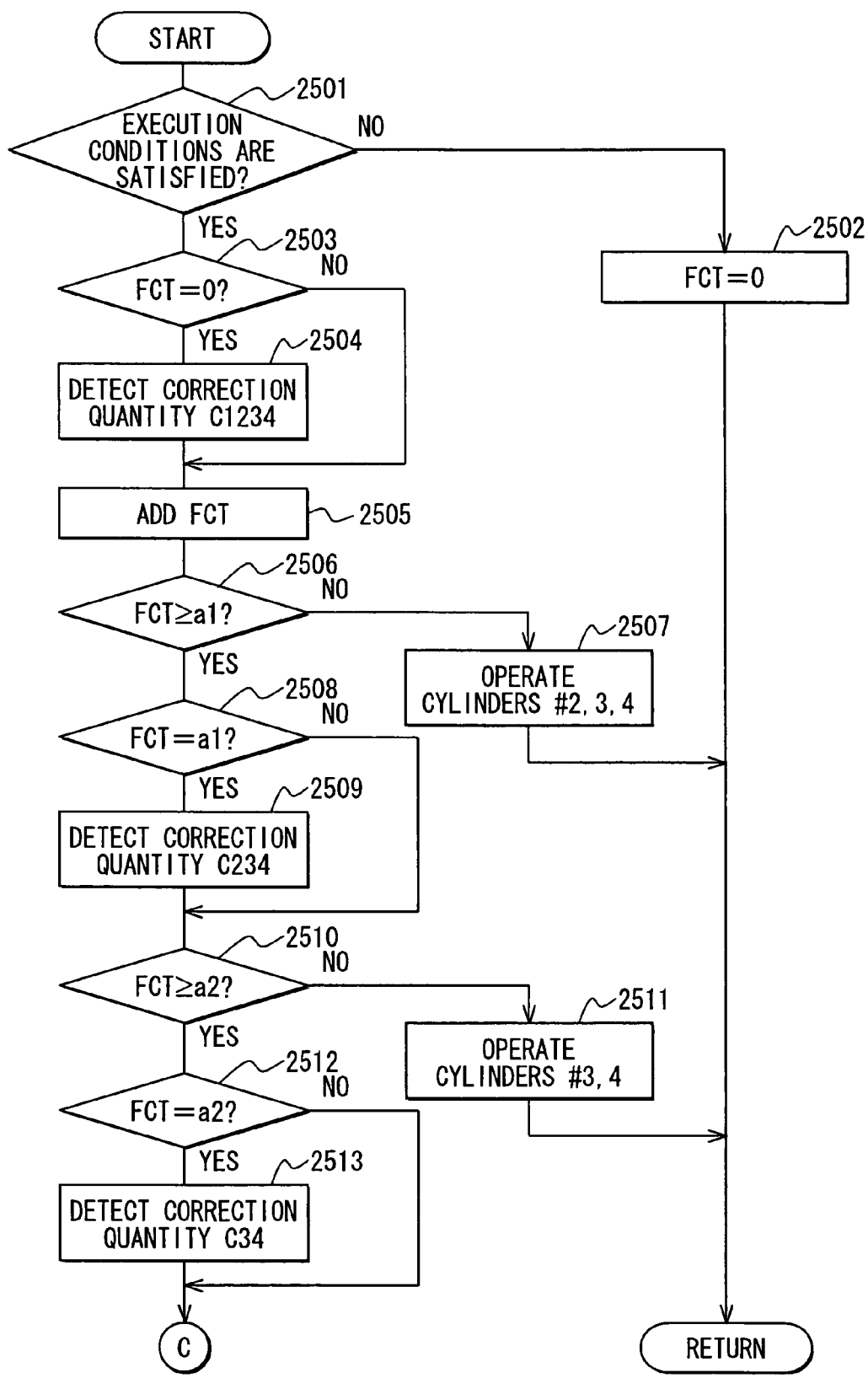
FIG. 17 is a flow chart showing the flow of processing of a routine for learning the cylinder air-fuel-ratio correction quantity of the fifth embodiment of the present invention.
Figure 18:
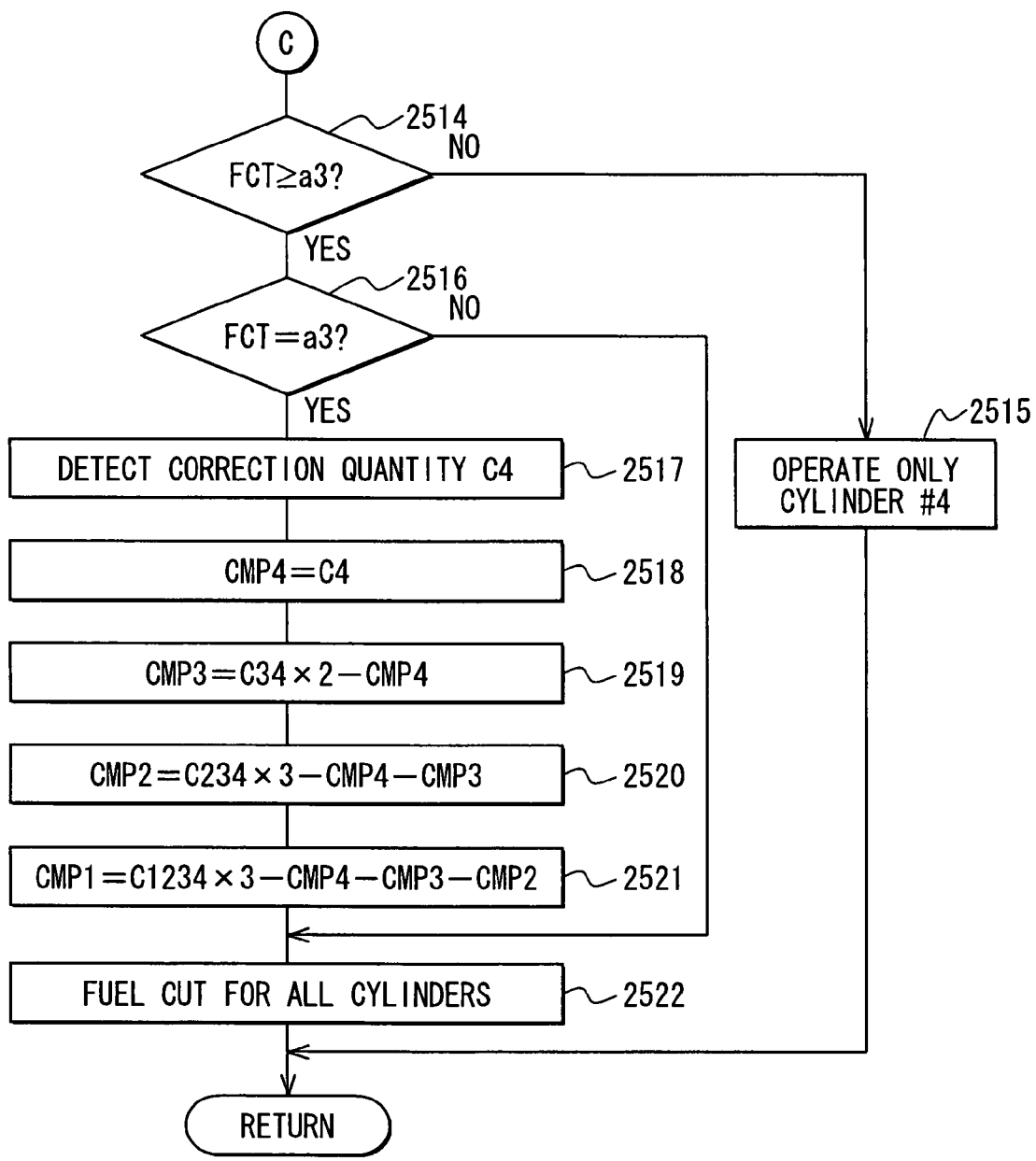
FIG. 18 is a flow chart showing the flow of processing of a routine for learning the cylinder air-fuel-ratio correction quantity of the fifth embodiment of the present invention.

The routine for learning a cylinder air-fuel-ratio correction quantity, shown in FIG. 17 and FIG. 18, is executed by the ECU 40 at predetermined intervals during a period in which the engine is operated (the ignition switch is ON). When this routine is started, it is determined first in step 2501 whether the execution conditions of the fuel cut at the time of deceleration are satisfied (whether the conditions of learning a cylinder air-fuel-ratio correction quantity) are satisfied. When the execution conditions of the fuel cut at the time of deceleration are not satisfied, the routine proceeds to step 2502 where the fuel cut time counter for counting the time FCT that elapses from the start of the fuel cut at the time of deceleration (hereinafter referred simply to as "fuel cut time") is initialized to make FCT=0 and then this routine is finished.

When it is determined in step 2501 that the execution conditions of the fuel cut at the time of deceleration are satisfied, the routine proceeds to step 2503 where it is determined whether the fuel cut time FCT is 0. When the fuel cut time FCT is 0, it is determined that it is just before the fuel cut at the time of deceleration is started, and the routine proceeds to step 2504 where an air-fuel-ratio correction quantity C1234 when four cylinders (all cylinders) are operated. The processing of this step 2504 is performed only when the fuel cut time FCT is 0 and thereafter is skipped.

Thereafter, the proceeds to step 2505 where the cycle time of starting this routine is added to the fuel cut time FCT that elapses until the last computation to find the fuel cut time FCT that elapses until this computation.

Then, the routine proceeds to step 2506 where it is determined whether the fuel cut time FCT becomes not smaller than the predetermined value a1. When the fuel cut time FCT does not yet become not smaller than the predetermined value a1, the routine proceeds to step 2507 where the number of the operating cylinders is decreased one by one, whereby only three cylinders #2, #3, and #4 are operated and one other cylinder #1 is stopped. Then, the air-fuel ratio of the discharge gas of all operating cylinders #2, #3, and #4 are feedback controlled to the target air-fuel ratio (for example, stoichiometric air-fuel ratio) on the basis of the output of the air-fuel ratio sensor 37. In this regard, the cylinder stopped at this time is not limited to the cylinder #1', but may be other cylinders. Alternatively, the cylinder to be stopped may be changed every time.

On the other hand, when it is determined in step 2506 that the fuel cut time FCT becomes not smaller than the predetermined value a1, the routine proceeds to step 2508 where it is determined whether the fuel cut time FCT is the predetermined value a1. Only when the fuel cut time FCT is the predetermined value a1, the routine proceeds to step 2509 where an air-fuel-ratio correction quantity C234 when three cylinders are operated is detected. The processing of this step 2509 is performed only once when the fuel cut time FCT reaches the predetermined time a1 and thereafter is skipped.

Then, the routine proceeds to step 2510 where it is determined whether the fuel cut time FCT becomes not smaller than the predetermined value a2 (=a1+a predetermined time). When the fuel cut time FCT does not become not smaller than the predetermined value a2, the routine proceeds to step 2511 where the number of the operating cylinders is further decreased by one, whereby only two cylinders #3, 4 are operated and the two other cylinders #1, 2 are stopped. Then, the air-fuel ratio of the exhaust gas of the two operating cylinders #3, 4 is feedback controlled to the stoichiometric air-fuel ratio (for example, target air-fuel ratio) on the basis of the output of the air-fuel ratio sensor 37.

On the other hand, when it is determined in step 2510 that the fuel cut time FCT becomes not smaller than the predetermined value a2, the routine proceeds to step 2512 where it is determined whether the fuel cut time FCT is the predetermined value a2. Only when the fuel cut time FCT is the predetermined value a2, the routine proceeds to step 2513 where an air-fuel-ratio correction quantity C34 when two cylinders are operated is detected. The processing of this step 2512 is performed only once when the fuel cut time FCT reaches the predetermined time a2 and thereafter is skipped.

Then, the routine proceeds to step 2514 shown in FIG. 18 where it is determined whether the fuel cut time FCT becomes not smaller than the predetermined value a3 (=a2+a predetermined time). When the fuel cut time FCT does not become not smaller than the predetermined value a3, the routine proceeds to step 2515 where the number of the operating cylinders is further decreased by one, whereby only one cylinder #4 is operated and three other cylinders #1, 2, and 3 are stopped. Then, the air-fuel ratio of the exhaust gas of the one operating cylinders #4 is feedback controlled to the target air-fuel ratio (for example, stoichiometric air-fuel ratio) on the basis of the output of the air-fuel ratio sensor 37.

On the other hand, when it is determined in step 2512 that the fuel cut time FCT becomes not smaller than the predetermined value a3, the routine proceeds to step 2516 where it is determined whether the fuel cut time FCT is the predetermined value a3. Only when the fuel cut time FCT is the predetermined value a3, the routine proceeds to step 2517 where an air-fuel-ratio correction quantity C4 when one cylinder is operated is detected. Then, the routine proceeds to step 2518 where the air-fuel-ratio correction quantity C4 detected in step 2517 when the one cylinder is operated, is learned as the cylinder air-fuel-ratio correction quantity CMP4 of the cylinder #4 and is updated and stored in the rewritable nonvolatile memory of the ECU 40.

Then, the routine proceeds to step 2519 where a cylinder air-fuel-ratio correction quantity CMP3 of the cylinder #3 is computed by the following equation by the use of the air-fuel-ratio correction quantity C34 when two cylinders are operated and the cylinder air-fuel-ratio correction quantity CMP4 of the cylinder #4 is updated and stored in the rewritable nonvolatile memory of the ECU 40.

$$CMP3 = C34 \times 2 - CMP4$$

Then, the routine proceeds to step 2520 where a cylinder air-fuel-ratio correction quantity CMP2 of the cylinder #2 is computed by the following equation by the use of the air-fuel-ratio correction quantity C234 when three cylinders are operated, the cylinder air-fuel-ratio correction quantity CMP4 of the cylinder #4, and the cylinder air-fuel-ratio correction quantity CMP3 of the cylinder #3 and is updated and stored in the rewritable nonvolatile memory of the ECU 40.

$$CMP2 = C234 \times 3 - CMP4 - CMP3$$

Then, the routine proceeds to step 2521 where the cylinder air-fuel-ratio correction quantity CMP1 of the cylinder #1 is computed by the following equation by the use of the air-fuel-ratio correction quantity C1234 when four cylinders are operated, the cylinder air-fuel-ratio correction quantity CMP4 of the cylinder #4, the cylinder air-fuel-ratio correction quantity CMP3 of the cylinder #3, and the cylinder air-fuel-ratio correction quantity CMP2 of the cylinder #2 and is updated and stored in the rewritable nonvolatile memory of the ECU 40.

$$CMP1 = C1234 \times 4 - CMP4 - CMP3 - CMP2$$

The processing of these steps 2517 to 2521 is performed once when the fuel cut time FCT reaches the predetermined value a3. Thereafter, it is determined that the period in which the cylinder air-fuel-ratio correction quantity is learned is finished and the processing of these steps 2517 to 2521 is skipped and the routine proceeds to step 2522 where the fuel injection to all cylinders is cut, that is, the fuel cut at the time of deceleration is performed.

Also in the fifth embodiment described above, the same effect as in the third embodiment can be produced.

In this regard, in this embodiment, the cylinder air-fuel-ratio correction quantity is learned while the number of the operating cylinders is sequentially decreased during a period in which the cylinder air-fuel-ratio correction quantity is learned. In contrast to this, the cylinder air-fuel-ratio correction quantity may be learned while the number of the operating cylinders is sequentially increased. In this case, it suffices to repeatedly perform the following processing: at first, for example, while only any one of the cylinders is operated, the cylinder air-fuel-ratio correction quantity is learned by the same method used in the third embodiment; then, while the number of operating cylinders is increased one by one, the cylinder air-fuel-ratio correction quantity of the other operating cylinder is computed by the use of the cylinder air-fuel-ratio correction quantity of the operating cylinder for which the cylinder air-fuel-ratio correction quantity has been already learned.

Sixth Embodiment

A sixth embodiment of the present invention will be described below with reference to the drawings.

In the sixth embodiment, the ECU 40 estimates the air-fuel ratio of each cylinder on the basis of the detected value of the air-fuel ratio sensor 37 by the use of a cylinder air-fuel-ratio estimation model (the detected value being the actual air-fuel ratio of the exhaust gas flowing through the exhaust collecting portion 36). The average value of the estimated air-fuel ratio of all cylinders is computed and is set as a reference air-fuel ratio (target air-fuel ratio of all cylinders), and the deviation between the estimated air-fuel ratio of each cylinder and the reference air-fuel ratio is computed for each cylinder. The air-fuel-ratio correction quantity of each cylinder (the fuel injection correction quantity of each cylinder) is computed so as to reduce the deviation, and the fuel injection quantity of each cylinder is corrected on the basis of the computation result. With this, the air-fuel ratio of the air-fuel mixture to be supplied to each cylinder is corrected for each cylinder to control the variations in air-fuel ratio between the cylinders so as to reduce the variations (this control is hereinafter referred to as "cylinder air-fuel-ratio control").

Here, a specific example of a model (hereinafter referred to as "cylinder air-fuel ratio estimation model") for estimating the air-fuel ratio of each cylinder on the basis of the detected value of the air-fuel ratio sensor 37 (actual air-fuel ratio of the exhaust gas flowing through the exhaust collecting section 36) will be described.

With attention focused on gas exchange in the exhaust collecting portion 36, the detected value of the air-fuel ratio sensor 37 is formed into a model of the summation of the product of the history of the estimated air-fuel ratio of each cylinder in the exhaust collecting portion 36 and a predetermined weighting coefficient and the product of the history of the detected value of the air-fuel sensor 37 and a predetermined weighting coefficient. Then, the air-fuel ratio of each cylinder is estimated by the use of this model. At this time, a Kalman filter is used as an observer.

More specifically, the model of the gas exchange in the exhaust collecting portion 36 is approximated by the following equation (2), $$ys(t) = k1 \times u(t-1) + k2 \times u(t-2) - k3 \times ys(t-1) - k4 \times ys(t-2) \tag{2}$$

where ys is the detected value of the air-fuel sensor 37, u is the air-fuel ratio of exhaust gas flowing into the exhaust collecting portion 36, and K1 to K4 are constants.

In the exhaust system exist a first-order delay element of the inflow and mixing of gas in the exhaust collecting portion 36 and a first-order delay due to a delay in response of the air-fuel ratio sensor 37. Thus, in the above equation (2), the last two histories are referred to in consideration of these first-delay elements.

When the above equation (2) is converted into a state-space model, the following equations (3a), (3b) are derived, $$X(t+1) = A \times X(t) + B \times u(t) + W(t) \tag{3a}$$

$$Y(t) = C \times X(t) + D \times u(t) \tag{3b}$$

where A, B, C, and D are parameters of the model, Y is the detected value of the air-fuel sensor 37, X is the estimated air-fuel ratio of each cylinder, which is a state variable, and W is noise.

Further, when a Kalman filter is designed from the above equations (3a), (3b), the following equation (4) can be obtained, $$X\hat{}(k+1|k)=A\times X\hat{}(k|k-1)+K\{Y(k)-C\times A\times X\hat{}(k|k-1)\} \quad (4)$$

where X^(X hat) is the estimated air-fuel ratio of each cylinder and K is a Kalman gain. X^(k+1|k) means that the estimated value of the next time (k+1) is found from the estimated value of time (k).

In this manner, by constructing the cylinder air-fuel-ratio estimation model by an observer of a Kalman filter type, the air-fuel ratio of each cylinder can be estimated in sequence as the combustion cycle proceeds.

Next, a method for setting an air-fuel-ratio detection timing of each cylinder (sampling timing of output of the air-fuel ratio sensor 37) will be described. In this sixth embodiment, the air-fuel-ratio detection timing of each cylinder is set by the map or the like according to the engine operating state (for example, engine load, engine rotation speed) in consideration of the fact that the delay from when the exhaust gas discharged from each cylinder reaches the vicinity of the air-fuel ratio sensor 37 until the air-fuel ratio of the exhaust gas is detected (hereinafter referred to as "delay in response of the exhaust system") varies according to the engine operating state. In general, as the engine load and the engine rotation speed decrease, the delay in response of the exhaust system becomes larger. Thus, the air-fuel-ratio detection timing of each cylinder is set so as to be shifted to a delay side as the engine load and the engine rotation speed decrease.

Figure 19A:
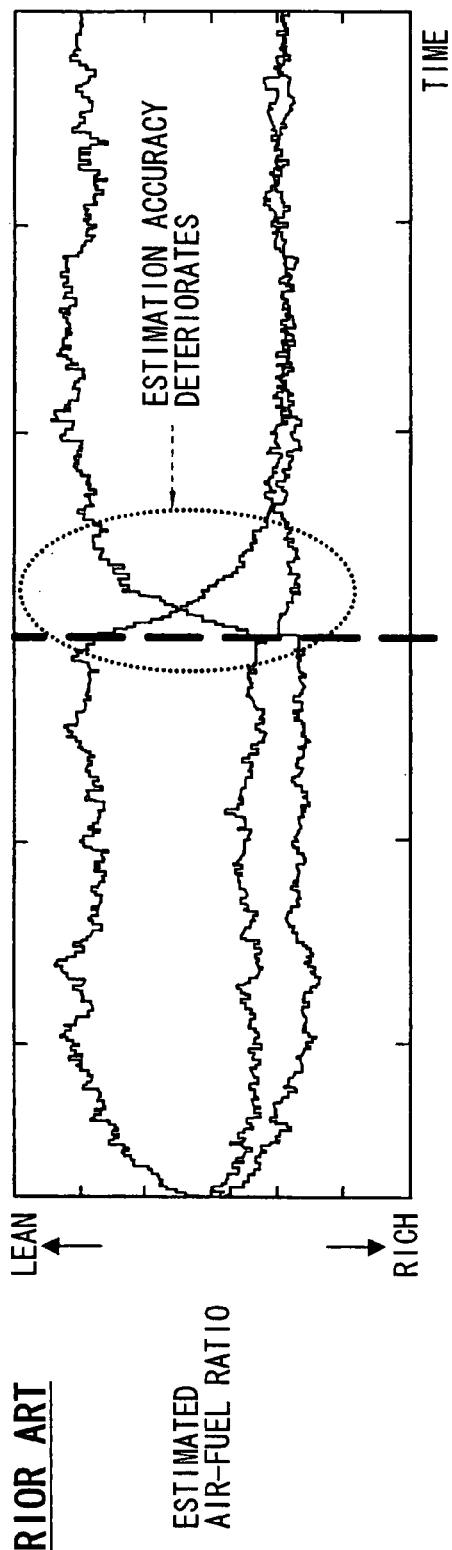
FIG. 19A is a time chart showing an example of estimating a cylinder air-fuel ratio of a related art.

As shown in FIG. 19A, when the air-fuel ratio of each cylinder is estimated in the same manner as usual at the time when the engine operating state is suddenly changed, the air-fuel ratio of each cylinder in the present operating state is estimated by the use of a state variable X in a different operating state in the past, so the estimation accuracy of the air-fuel ratio of each cylinder may become remarkably low.

Figure 19B:
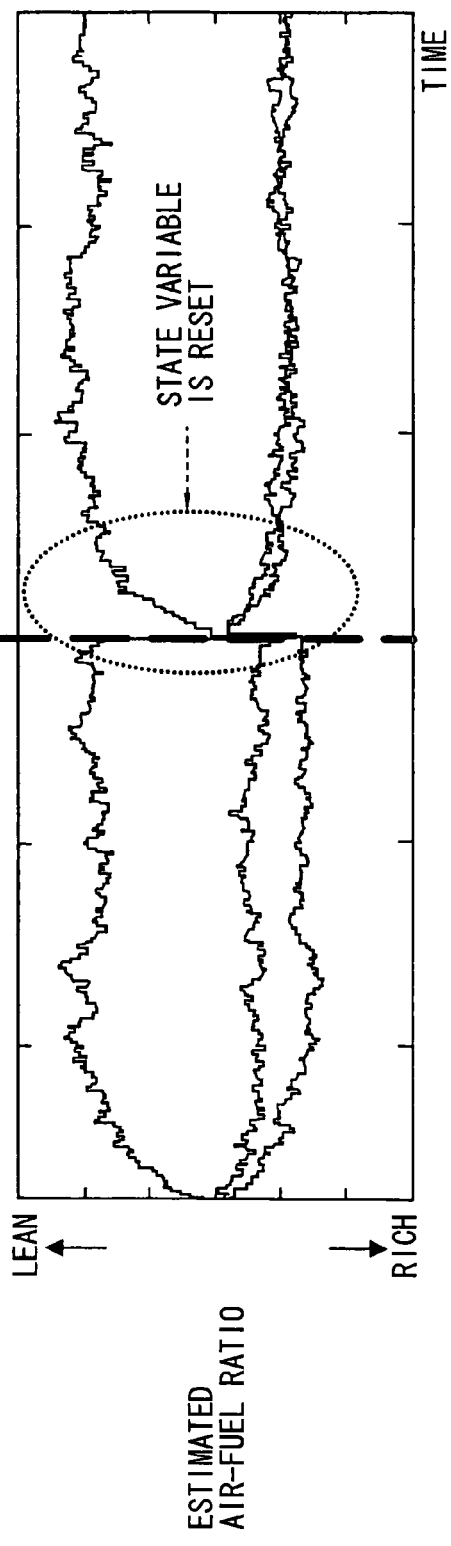
FIG. 19B is a time chart showing an example of estimating a cylinder air-fuel ratio of a sixth embodiment.

In this sixth embodiment, as a countermeasure against this, it is determined whether the engine operating state is an operating state in which the correct estimation of the air-fuel ratio of each cylinder is difficult (hereinafter referred to as "an operating state in which the estimation of a cylinder air-fuel ratio is difficult"). When it is determined that the engine operating state is an operating state in which the estimation of a cylinder air-fuel ratio is difficult, the state variable X is reset to an initial value (for example, 0). With this, as shown in FIG. 19B, when the engine operating state is suddenly changed to be brought to the operating state in which the estimation of a cylinder air-fuel ratio is difficult, the state variable X can be reset and returned to the initial value (for example, 0). Thus, when the air-fuel ratio of each cylinder is estimated next, the air-fuel ratio of each cylinder in the present operating state can be estimated by the use of the reset state variable X without using the state variable X affected by a different operating state in the past. Accordingly, a decrease in the estimation accuracy of the air-fuel ratio of each cylinder at the time when the engine operating state is suddenly changed can be reduced.

Figure 20:
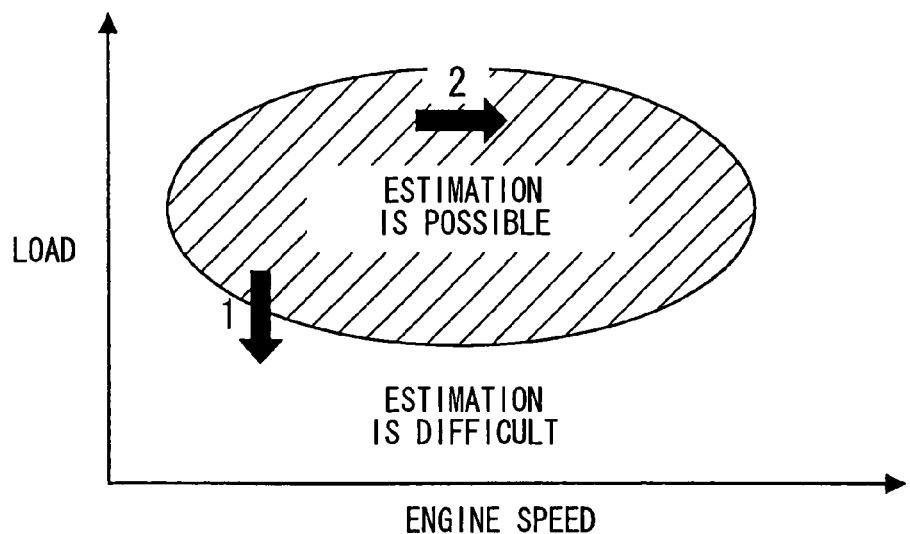
FIG. 20 is a diagram showing a case in which an engine operating state is steadily an operating state in which the estimation of a cylinder air-fuel ratio is difficult and a case in which the engine operating state is transiently the operating state in which the estimation of a cylinder air-fuel ratio is difficult.

Here, as shown in FIG. 20, it can be thought that the engine operating state is steadily the operating state in which the estimation of a cylinder air-fuel ratio is difficult is broadly divided into two following cases. The first case is a case in which the engine operating state (for example, rotation speed and load) is changed from an operating range in which the estimation of a cylinder air-fuel ratio is possible (operating range in which the correct estimation of a cylinder air-fuel ratio is possible) to an operating range in which the estimation of a cylinder air-fuel ratio is difficult (operating range in which the correct estimation of a cylinder air-fuel ratio is difficult), thereby being brought to an operating state in which the estimation of a cylinder air-fuel ratio is difficult. The second case is a case in which the operating state of the engine is suddenly changed within the operating range in which the estimation of a cylinder air-fuel ratio is possible, thereby being brought transiently (temporarily) to an operating state in which the estimation of a cylinder air-fuel ratio is difficult.

In consideration of these circumstances, when the engine operating state is brought steadily to the operating state in which the estimation of a cylinder air-fuel ratio is difficult, the operating state in which the estimation of a cylinder air-fuel ratio is difficult continues not only the instant when the operating state is changed but also in a period subsequent to the instant, so the state variable X is held in a reset state during the period and the estimation of the air-fuel ratio of each cylinder is prohibited.

On the other hand, when the engine operating state is suddenly changed to be brought transiently (temporarily) to the operating state in which the estimation of a cylinder air-fuel ratio is difficult, the state variable X is reset only the instant when the engine operating state is suddenly changed and the processing of estimating the air-fuel ratio of each cylinder is continued from the operating state.

Moreover, when it is determined that the engine operating state is steadily or transiently the operating state in which the estimation of the air-fuel ratio of each cylinder is difficult and the state variable X is reset, the air-fuel ratio of each cylinder is corrected by the use of the air-fuel-ratio correction quantity of each cylinder (the correction quantity of the fuel injection quantity of each cylinder), which is found just before the state variable X is reset. Then, after a predetermined period of time long enough to estimate the air-fuel ratio of each cylinder with high accuracy elapses from the time when the reset of the state variable X is released, the cylinder air-fuel-ratio control is returned to normal cylinder air-fuel-ratio control.

The processing contents of the respective routines for the cylinder air-fuel-ratio control, which are executed by the ECU 40, will be described with reference to FIG. 21 to FIG. 25.

[Main Routine for Cylinder Air-fuel-ratio Control]

Figure 21:
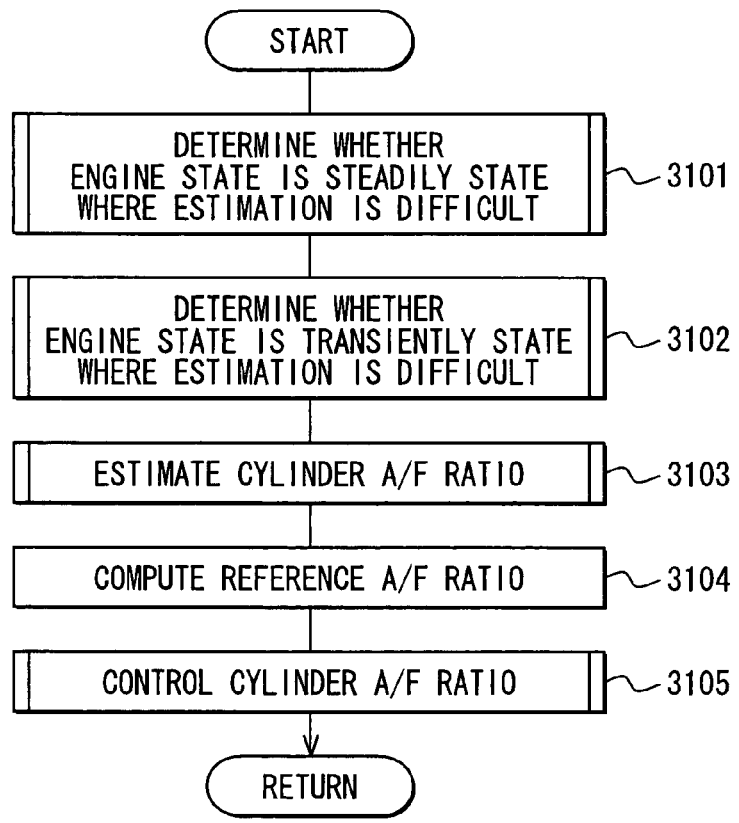
FIG. 21 is a flow chart showing the flow of processing of a main routine for cylinder air-fuel ratio control.
Figure 22:
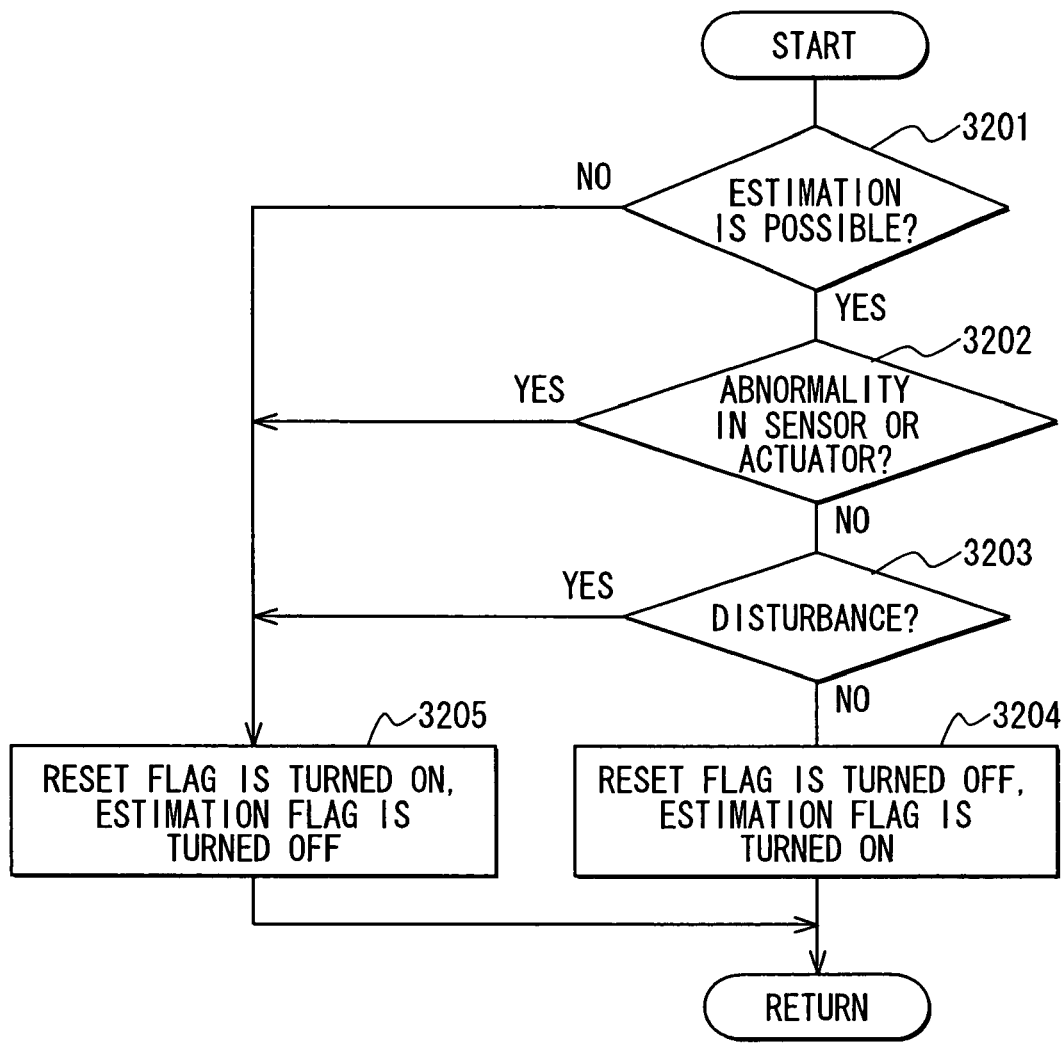
FIG. 22 is a flow chart showing the flow of processing of a routine for determining whether the engine operating state is steadily the operating state in which the estimation of a cylinder air-fuel ratio is difficult.
Figure 23:
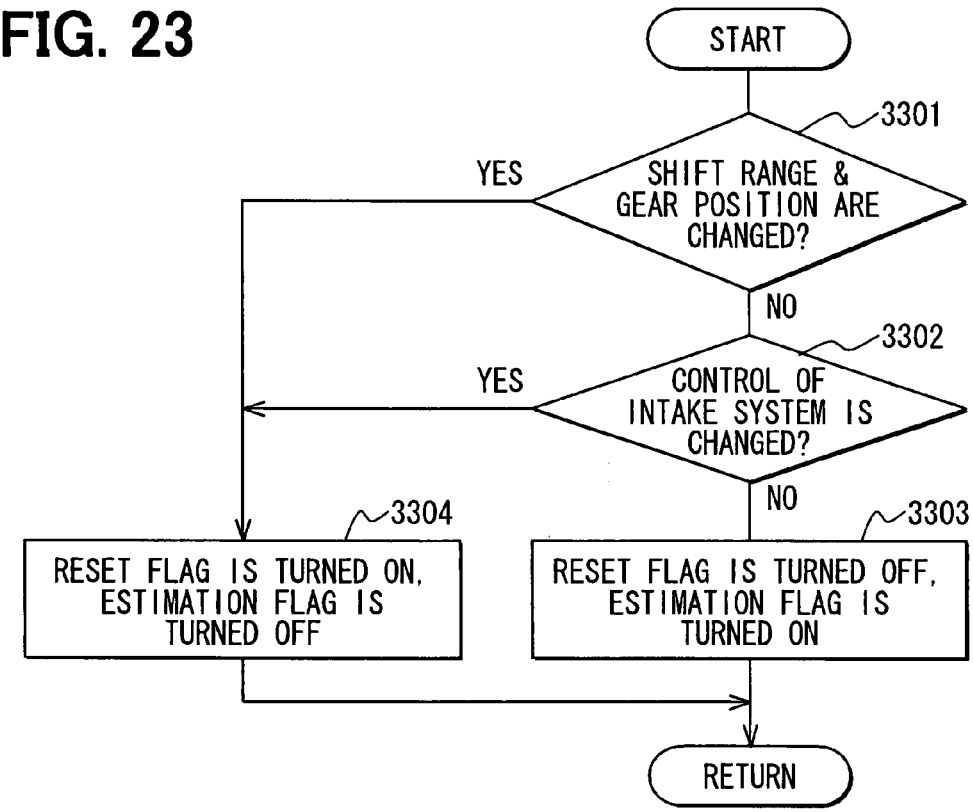
FIG. 23 is a flow chart showing the flow of processing of a routine for determining whether the engine operating state is transiently the operating state in which the estimation of a cylinder air-fuel ratio is difficult.

The main routine for cylinder air-fuel-ratio control, shown in FIG. 21, is started at intervals of a specified crank angle (for example, 30° CA) in synchronization with the output pulse of the crank angle sensor 33. In step 3101, the routine shown in FIG. 22 is executed to determine whether the engine operating state is steadily the operating state in which the estimation of a cylinder air-fuel ratio is difficult. Then, the routine proceeds to step 3102 where the routine shown in FIG. 23 is executed to determine whether the engine operating state is transiently the operating state in which the estimation of a cylinder air-fuel ratio is difficult.

Figure 24:
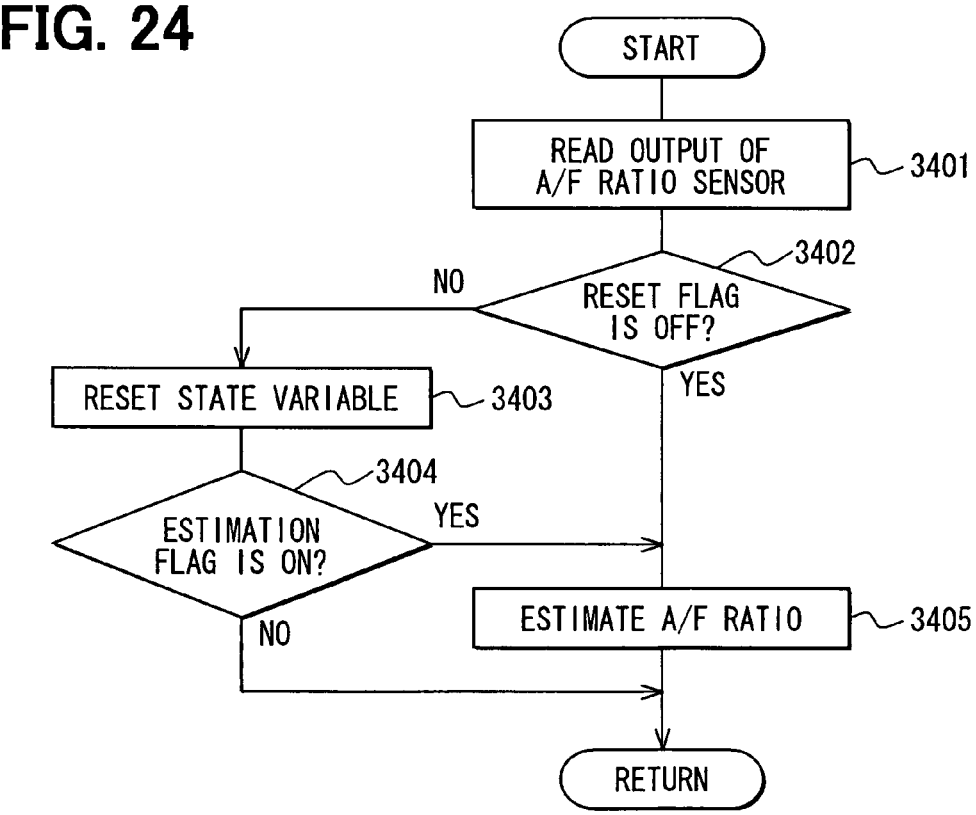
FIG. 24 is a flow chart showing the flow of processing of a routine for estimating a cylinder air-fuel ratio.

Then, the routine proceeds to step 3103 where the routine for estimating a cylinder air-fuel ratio, shown in FIG. 24, is executed to estimate the air-fuel ratio of each cylinder on the basis of the detected value of the air-fuel ratio sensor 37 by the use of the above-mentioned model for estimating a cylinder air-fuel ratio. At this time, when it is determined that the engine operating state is steadily the operating state in which the estimation of a cylinder air-fuel ratio is difficult, the state variable X is always held in a state in which the state variable X is reset during the period of the operating state and the estimation of the air-fuel ratio of each cylinder is prohibited. On the other hand, when it is determined that the engine operating state is transiently the operating state in which the estimation of a cylinder air-fuel ratio of is difficult, the state variable X is reset only at the instant when the engine operating state is brought to the operating state and thereafter the estimation of air-fuel ratio of each cylinder is also continued.

Then, the routine proceeds to step 3104 where the average value of the estimated air-fuel ratios of all cylinders is computed and is set to the reference air-fuel ratio (target air-fuel ratio of all cylinders).

Figure 25:
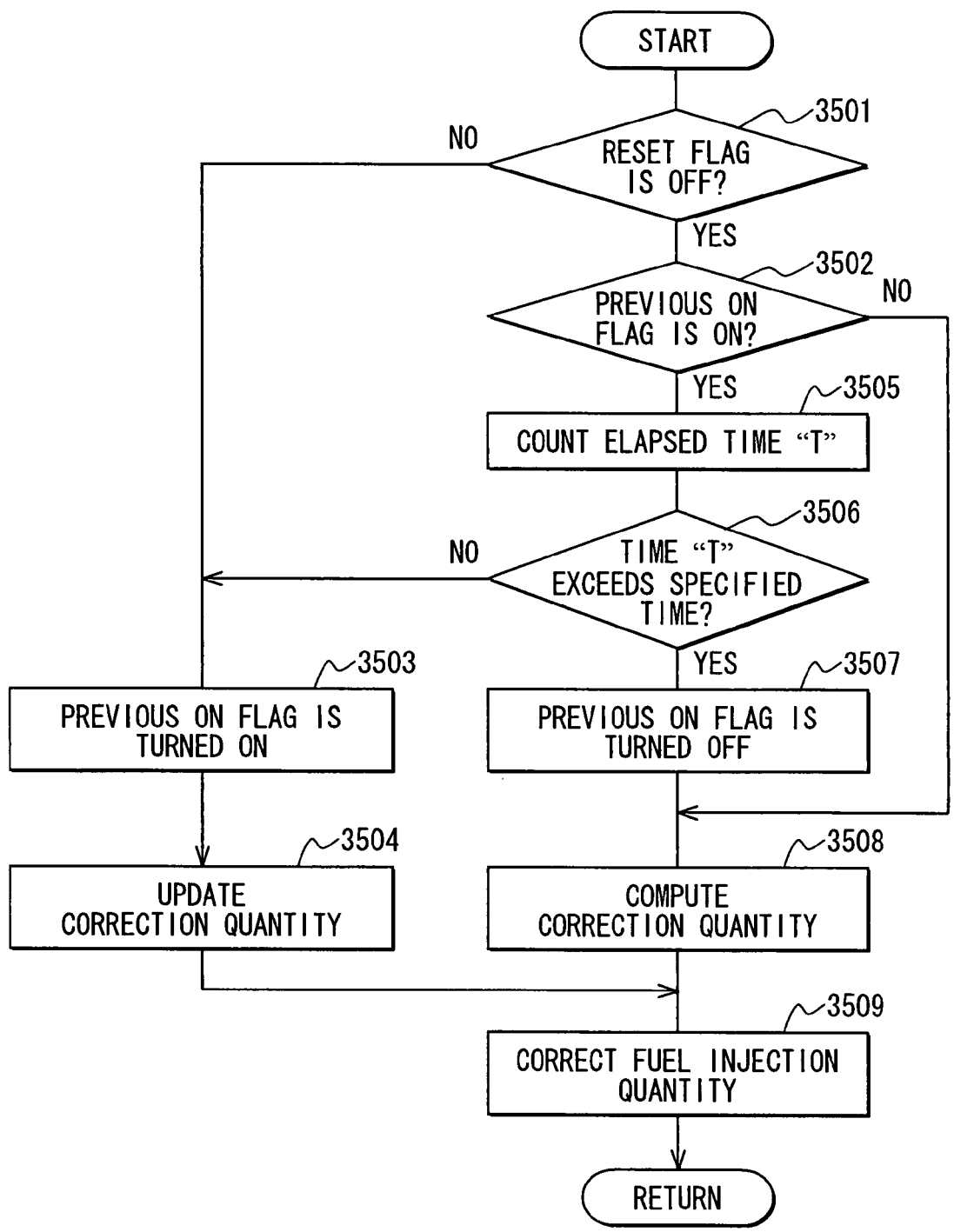
FIG. 25 is a flow chart showing the flow of processing of the routine for cylinder air-fuel-ratio control.

Then, the routine proceeds to step 3105 where the routine for controlling a cylinder air-fuel ratio, shown in FIG. 25, is performed to compute the deviation between the estimated air-fuel ratio of each cylinder and the reference air-fuel ratio. Then, the air-fuel ratio correction quantity of each cylinder (the correction quantity of the fuel injection quantity of each cylinder) is computed in such a way as to reduce the deviation. Then, the fuel injection quantity of each cylinder is corrected on the basis of the air-fuel-ratio correction quantity of each cylinder to correct the air-fuel ratio of the air-fuel mixture to be supplied to each cylinder for each cylinder to control the air-fuel ratio in such a way as to reduce variations in the air-fuel ratio between the cylinders.

At this time, when it is determined that the engine operating state is steadily or transiently the operating state in which the estimation of a cylinder air-fuel ratio is difficult and the state variable X is reset, the air-fuel ratio of each cylinder is corrected by the use of the air-fuel-ratio correction quantity of each cylinder that is found just before the state variable X is reset. Then, after a specified period of time elapses from the time when the reset of the state variable X is released, the cylinder air-fuel-ratio control is returned to the normal cylinder air-fuel-ratio control.

[Routine for Determining Whether an Engine Operating State is Steadily an Operating State in which the Estimation of a Cylinder Air-fuel Ratio is Difficult]

The routine for determining whether an engine operating state is steadily an operating state in which the estimation of a cylinder air-fuel ratio is difficult, shown in FIG. 22, is a sub-routine executed in step 3101 of the main routine for cylinder air-fuel ratio control, shown in FIG. 21. When this routine is started, it is determined first in steps 3201 to 3203 in the following manner whether the engine operating state is steadily the operating state in which the estimation of a cylinder air-fuel ratio is difficult.

First, whether the engine operating state is an operating range in which the estimation of a cylinder air-fuel ratio is possible is determined in step 3201 by whether, for example, the following conditions (A1) to (A5) are satisfied.

(A1) The temperature of a sensor element of the air-fuel ratio sensor 37 is within an active temperature range (the resistance of the sensor element is within a specified range).
(A2) The target air-fuel ratio is within a specified range (for example, within a stoichiometric air-fuel ratio and its vicinity).
(A3) The detected value of the air-fuel ratio sensor 37 is within a specified range (for example, within a stoichiometric air-fuel ratio and its vicinity).
(A4) The engine rotation speed is within a specified range.

In general, in a high rotation range in which the engine rotation speed is high, the velocity of flow of exhaust gas is high and hence delay in response of the air-fuel ratio sensor 37 becomes large, which makes it difficult to correctly estimate the air-fuel ratio of each cylinder. Thus, the specified range of the engine rotation speed is set, for example, to a low and middle rotation speed range excluding the high rotation range in which delay in response of the air-fuel ratio sensor 37 becomes large.

(A5) The engine load (for example, intake air quantity and intake pipe pressure) is within a specified range.

In general, in a low load range in which the engine load is low, the exhaust gas quantity of each cylinder is small and hence variations in the flow of exhaust gas between the cylinders are large because of the difference in length, volume, and shape of the exhaust manifold 35 of each cylinder, which makes it difficult to correctly estimate the air-fuel ratio of each cylinder. Thus, the specified range of the engine load is set, for example, to a middle and high load range excluding a low load range in which variations in the air-fuel ratio of each cylinder does not much affect the output of the air-fuel ratio sensor 37.

When all of these conditions (A1) to (A5) are satisfied, it is determined that the engine operating state is within an operating range in which the estimation of a cylinder air-fuel ratio is possible. However, if any one of these conditions (A1) to (A5) is not satisfied, it is determined that the engine operating state is not within the operating range in which the estimation of a cylinder air-fuel ratio is possible (in other words, the engine operating state is an operating state in which the estimation of a cylinder air-fuel ratio is difficult). When it is determined in this step 3201 that the engine operating state is the operating state in which the estimation of a cylinder air-fuel ratio is difficult (in other words, in the case of NO), it is determined that the engine operating state is steadily the operating state in which the estimation of a cylinder air-fuel ratio is difficult.

Moreover, also when an abnormality occurs in the sensor or the actuator relating to the air-fuel ratio control, the correct estimation of the air-fuel ratio of each cylinder is difficult. Hence, in step 3202, whether the engine operating state is steadily the operating state in which the estimation of a cylinder air-fuel ratio is difficult is determined by whether an abnormality occurs in the sensor or the actuator relating to the air-fuel ratio control.

At this time, whether an abnormality occurs in the sensor or the actuator relating to the air-fuel ratio control is determined, for example, by whether at least one of the following abnormalities (B1) to (B14) detected by a self-diagnostic function mounted in the vehicle occurs.

(B1) Abnormality in a heater of the air-fuel ratio sensor 37
(B2) Abnormality of a broken wire or a short circuit of the air-fuel ratio sensor 37
(B3) Abnormality in response of the air-fuel ratio sensor 37
(B4) Abnormality in the fuel system
(B5) Abnormality in the fuel injection valve 20
(B6) Abnormality in fuel pressure
(B7) Abnormality in the intake pipe pressure sensor 18
(B8) Abnormality in an atmospheric pressure sensor (not shown)
(B9) Abnormality in the fuel pressure sensor 24
(B10) Abnormality in an intake air temperature sensor (not shown)
(B11) Abnormality in the air flow meter 14
(B12) Abnormality in which a fuel evaporated gas purge system is always ON (for example, abnormality in which a purge control valve is fixedly opened)
(B13) Abnormality in the cam angle sensors 31, 32 and in the crank angle sensor 33
(B14) Detection of an accidental fire (abnormality of an accidental fire)

If at least one of these abnormalities (B1) to (B14) occurs, it is determined that an abnormality occurs in the sensors and actuators relating to the air-fuel ratio control. However, if any one of these abnormalities (B1) to (B14) does not occur, it is determined that an abnormality does not occur in the sensors and actuators relating to the air-fuel ratio control. When it is determined in this step 3202 that an abnormality occurs in the sensors and actuators relating to the air-fuel ratio control (in other words, in the case of YES), the correct estimation of the air-fuel ratio of each cylinder is difficult and hence it is determined that the engine operating state is steadily the operating state in which the estimation of a cylinder air-fuel ratio is difficult.

Furthermore, also when turbulence to the detection of an air-fuel ratio by the air-fuel ratio sensor 37 occurs, the correct estimation of the air-fuel ratio of each cylinder is difficult. Thus, in step 3203, whether the engine operating state is steadily the operating state in which the estimation of a cylinder air-fuel ratio is difficult is determined by whether turbulence to the detection of air-fuel ratio by the air-fuel ratio sensor 37 occurs.

At this time, whether turbulence occurs in the detection of air-fuel ratio by the air-fuel ratio sensor 37 is determined, for example, by whether at least one of the following conditions (C1) to (C3) is satisfied.
(C1) Vapor is easily produced in the fuel system (for example, a fuel temperature is not lower than a specified value).
(C2) Fuel evaporation gas is being purged to an intake air system by a fuel evaporation gas purge system.
(C3) Fuel cut (including the operation of reducing the number of operating cylinders) is being performed.

If at least one of these conditions (C1) to (C3) is satisfied, it is determined that turbulence to the detection of the air-fuel ratio by the air-fuel ratio sensor 37 occurs. However, when all of these conditions (C1) to (C3) are not satisfied, it is determined that turbulence to the detection of an air-fuel ratio by the air-fuel ratio sensor 37 does not occur. When it is determined in this step 3203 that turbulence to the detection of the air-fuel ratio by the air-fuel ratio sensor 37 occurs (in other words, in the case of YES), the correct estimation of the air-fuel ratio of each cylinder is difficult and hence it is determined that the engine operating state is steadily the operating state in which the estimation of a cylinder air-fuel ratio is difficult.

When it is determined in step 3201 that the engine operating state is in the operating range in which the estimation of a cylinder air-fuel ratio is possible (YES) and it is determined in step 3202 that an abnormality does not occur in the sensors and actuators relating to the air-fuel ratio control (NO) and it is determined in step 3203 that disturbance to the detection of the air-fuel ratio by the air-fuel ratio sensor 37 does not occur (NO), it is determined that the engine operating state is the operating state in which the estimation of a cylinder air-fuel ratio is possible. Then, the routine proceeds to step 3204 where the state variable reset flag is reset to OFF (or is held OFF) and a cylinder air-fuel-ratio estimation flag is set to ON (or is held ON).

On the other hand, when it is determined in step 3201 that the engine operating state is in the operating range in which the estimation of a cylinder air-fuel ratio is difficult (NO) or it is determined in step 3202 that an abnormality occurs in the sensors and actuators relating to the air-fuel ratio control (YES) or it is determined in step 3203 that disturbance to the detection of the air-fuel ratio by the air-fuel ratio sensor 37 occurs (YES), it is determined that the engine operating state is steadily the operating state in which the estimation of a cylinder air-fuel ratio is difficult. Then, the routine proceeds to step 3205 where the state variable reset flag is set to ON (or is held ON) and a cylinder air-fuel-ratio estimation flag is reset to OFF (or is held OFF).

[Routine for Determining Whether an Engine Operating State is Transiently an Operating State in Which the Estimation of a Cylinder Air-fuel Ratio is Difficult]

The routine for determining whether an engine operating state is transiently an operating state in which the estimation of a cylinder air-fuel ratio is difficult, shown in FIG. 23, is a subroutine executed in step 3102 of the main routine for cylinder air-fuel ratio control, shown in FIG. 21. It is determined in steps 3301, 3302 whether the engine operating state is transiently the operating state in which the estimation of a cylinder air-fuel ratio is difficult.

It is determined in step 3301 whether the shift range and gear position of the transmission (not shown) are changed. When it is determined in step 3301 whether the shift range and gear position of the transmission (not shown) are changed (YES), the engine operating state is temporarily suddenly changed and hence the estimation of the air-fuel ratio becomes temporarily difficult, so it is determined that the engine operating state is transiently the operating state in which the estimation of a cylinder air-fuel ratio is difficult.

On the other hand, it is determined whether the control of the intake system is changed. For example, in a system provided with a variable valve lift unit, whether the control of the intake system is changed is determined by whether the valve lift quantities of the intake valve 25 and the exhaust valve 26 are changed by the variable lift unit. Moreover, in a system provided with a variable intake unit, whether the control of the intake system is changed may be determined by whether the length, number, or diameter of the intake pipe passage is changed by the variable intake unit. Furthermore, in a system provided with an air flow control valve, whether the control of the intake system is changed may be determined by whether air flow intensity is changed by the air flow control valve.

When it is determined in this step 3302 that the control of the intake system is changed (YES), the engine operating state is temporarily suddenly changed and hence the estimation of the air-fuel ratio becomes temporarily difficult, so it is determined that the engine operating state is transiently the operating state in which the estimation of a cylinder air-fuel ratio is difficult.

When it is determined in step 3301 that the shift range and the gear position are not changed (NO) and it is determined in step 3302 that the control of the intake system is not changed (NO), it is determined that the engine operating state is the operating state in which the estimation of a cylinder air-fuel ratio is possible. Then, the routine proceeds to step 3303 where the state variable reset flag is reset to OFF (or is held OFF) and the cylinder air-fuel-ratio estimation flag is set to ON (or is held ON).

On the other hand, when it is determined in step 3301 that the shift range and the gear position are changed (YES) or it is determined in step 3302 that the control of the intake system is changed (YES), it is determined that the engine operating state is transiently the operating state in which the estimation of a cylinder air-fuel ratio is difficult. Then, the routine proceeds to step 3304 where the state variable reset flag is set to ON (or is held ON), but the cylinder air-fuel-ratio estimation flag is not reset to OFF but is held ON.

[Routine for Estimating a Cylinder Air-fuel Ratio]

A routine for estimating a cylinder air-fuel ratio, shown in FIG. 24, is a subroutine executed in step 3103 of the main routine for cylinder air-fuel ratio control, shown in FIG. 21. When this routine is started, the output of the air-fuel sensor 37 (detected value of the air-fuel ratio) is read in step 3401 and then the routine proceeds to step 3402 where it is determined whether the state variable rest flag is OFF.

When it is determined in this step 3402 that the state variable rest flag is OFF, the routine proceeds to step 3405 where the air-fuel ratio of the cylinder for which an air-fuel ratio is to be estimated this time is estimated on the basis of the detected value of the air-fuel ratio sensor 37 by the use of the model for estimating a cylinder air-fuel ratio.

On the other hand, when it is determined in this step 3402 that the state variable rest flag is ON (in other words, when it is determined in the routine shown in FIG. 22 that the engine operating state is steadily the operating state in which the estimation of a cylinder air-fuel ratio is difficult, or when it is determined in the routine shown in FIG. 23 that the engine operating state is transiently the operating state in which the estimation of a cylinder air-fuel ratio is difficult), the routine proceeds to step 3403 where the state variable X is reset to an initial value (for example, 0). The processing of this step 3403 acts as state variable reset means as claimed in claims.

Then, the routine proceeds to step 3404 whether the cylinder air-fuel-ratio estimation flag is ON. When it is determined that the cylinder air-fuel-ratio estimation flag is ON (in other words, it is determined in the routine shown in FIG. 23 that the engine operating state is transiently the operating state in which the estimation of a cylinder air-fuel ratio is difficult), the routine proceeds to step 3405 where the air-fuel ratio of the cylinder for which an air-fuel ratio is to be estimated this time is estimated on the basis of the detected value of the air-fuel ratio sensor 37 by the use of the model for estimating a cylinder air-fuel ratio.

On the other hand, when it is determined in this step 3404 that the cylinder air-fuel-ratio estimation flag is OFF (in other words, when it is determined in the routine shown in FIG. 22 that the engine operating state is steadily the operating state in which the estimation of a cylinder air-fuel ratio is difficult, this routine is finished without executing the processing of step 3405 (the processing of estimating the air-fuel ratio of each cylinder).

According to the forgoing processing, when it is determined that the engine operating state is steadily the operating state in which the estimation of a cylinder air-fuel ratio is difficult, the state in which the state variable X is always reset is held in the operating state and the estimation of the air-fuel ratio of each cylinder is prohibited. In other words, when the engine operating state is brought steadily to the operating state in which the estimation of a cylinder air-fuel ratio is difficult, the operating state in which the estimation of a cylinder air-fuel ratio is difficult continues for a period of time not only at the instant when the engine operating state is changed but also after the instant. Thus, for the period of time, the state variable X is held reset and the estimation of the air-fuel ratio of each cylinder is prohibited.

On the other hand, when it is determined that the engine operating state is transiently the operating state in which the estimation of a cylinder air-fuel ratio is difficult, the state variable X is reset only at the instant when the engine operating state is brought to the operating state and the estimation of the air-fuel ratio of each cylinder is continued also after the instant. In other words, when the engine operating state is suddenly changed to be brought transiently (temporarily) to the operating state in which the estimation of a cylinder air-fuel ratio is difficult, the state variable X is reset at the instant and the estimation of the air-fuel ratio of each cylinder is continued.

[Routine for Cylinder Air-fuel Ratio Control]

A routine for cylinder air-fuel ratio control, shown in FIG. 25, is a subroutine executed in step 3105 of the main routine for cylinder air-fuel ratio control, shown in FIG. 21.

When this routine is started, it is determined first in step 3501 whether the state variable reset flag is OFF. When it is determined in step 3501 whether the state variable reset flag is OFF, the routine proceeds to step 3502 where it is determined whether a previous ON flag that means that the state variable reset flag has been previously set to ON is ON. When the previous ON flag is OFF, the routine proceeds to step 3508 where the deviation between the estimated air-fuel ratio of each cylinder and the reference air-fuel ratio is computed, and the air-fuel-ratio correction quantity of each cylinder (the correction quantity of the fuel injection quantity of each cylinder) is computed so as to reduce the deviation.

Then, when the state variable reset flag is set to ON (when the state variable X is reset), the routine proceeds from step 3501 to step 3503 where the previous ON flag is set to ON. Then, the routine proceeds to step 3504 where the last value of the air-fuel-ratio correction quantity of each cylinder (in other words, the air-fuel-ratio correction quantity found just before the state variable X is reset) is made this value of the air-fuel-ratio correction quantity of each cylinder.

Then, when the state variable reset flag is reset from ON to OFF (when the reset of the state variable X is released), the routine proceeds from step 3501 to step 3502. It is determined in this step 3502 that the previous ON flag is ON, and then the routine proceeds to step 3505 where a counter for counting an elapsed time T that elapses after the state variable reset flag is reset from ON to OFF (after the reset of the state variable X is released) is counted up.

Then, the proceeds to step 3506 where it is determined whether the elapsed time T that elapses after the state variable reset flag is reset from ON to OFF is larger than a specified time (time long enough to estimate the air-fuel ratio of each cylinder with high accuracy). When the elapsed time T is not larger than the specified time, the routine proceeds to step 3503 where the previous ON flag is set to ON. Then, the routine proceeds to step 3504 where the last value of the air-fuel-ratio correction quantity of each cylinder (in other words, the air-fuel-ratio correction quantity found just before the state variable X is reset) is made this value of the air-fuel-ratio correction quantity of each cylinder.

Then, when it is determined in step 3506 that the elapsed time T that elapses after the state variable reset flag is reset from ON to OFF is larger than the specified time, the routine proceeds to step 3507 where the previous ON flag is reset to OFF. Then, the routine proceeds to step 3508 where the deviation between the estimated air-fuel ratio of each cylinder and the reference air-fuel ratio is computed and then the air-fuel-ratio correction quantity is computed so as to reduce the deviation.

In step 3504 or step 3508, the air-fuel-ratio correction quantity of each cylinder is computed and then the routine proceeds to step 3509 where the fuel injection quantity of each cylinder is corrected on the basis of the air-fuel-ratio correction quantity of each cylinder to correct, for each cylinder, the air-fuel ratio of the air-fuel mixture to be supplied to each cylinder to reduce variations in the air-fuel ratio between the cylinders.

When it is determined that the engine operating state is steadily or transiently the operating state in which the estimation of a cylinder air-fuel ratio is difficult and the state variable X is reset by the foregoing processing, the air-fuel ratio of each cylinder is corrected by the use of the air-fuel-ratio correction quantity of each cylinder found just before the state variable X is reset. Then, when a specified time elapses after the reset of the state variable X is released, the cylinder air-fuel ratio control is returned to the normal cylinder air-fuel ratio control.

In this sixth embodiment described above, in the system for estimating the air-fuel ratio of each cylinder on the basis of the model for relating the detected value of the air-fuel ratio sensor 37 disposed in the exhaust collecting portion 36 of the engine 11 to the cylinder air-fuel ratio (air-fuel ratio of each cylinder) as the state variable X, when the engine operating state is the operating state in which the estimation of a cylinder air-fuel ratio is difficult (when the engine operating state is the operating state in which the correct estimation of the air-fuel ratio of each cylinder is difficult), the state variable X is reset. With this, when the engine operating state is suddenly changed to be brought into the operating state in which the estimation of a cylinder air-fuel ratio is difficult, the state variable X can be reset and returned to the initial value (for example, 0). Thus, when the air-fuel ratio of each cylinder is estimated the next time, the air-fuel ratio of each cylinder in the present operating state can be estimated by using the reset state variable without using the state variable X affected by the different operating state in the past. Accordingly, a reduction in the accuracy of estimating the air-fuel ratio of each cylinder when the engine operating state is suddenly changed can be reduced.

Moreover, in this sixth embodiment, when the engine operating state is brought steadily to the operating state in which the estimation of a cylinder air-fuel ratio is difficult, the state variable X is held reset not only at the instant when the operating state is changed but also for a period of time in which the operating state in which the estimation of a cylinder air-fuel ratio is difficult continues. Accordingly, even when the engine operating state is brought steadily to the operating state in which the estimation of a cylinder air-fuel ratio is difficult, a reduction in the accuracy of estimating the air-fuel ratio of each cylinder can be reduced.

Further, when the engine operating state is brought steadily to the operating state in which the estimation of a cylinder air-fuel ratio is difficult, in consideration of the fact that the state in which the air-fuel ratio of each cylinder cannot be correctly estimated continues for a relatively long time, the estimation of the air-fuel ratio of each cylinder is prohibited. Accordingly, the erroneous estimation of the air-fuel ratio of each cylinder can be prevented and the computation load of the ECU 40 can be reduced.

Still further, in this sixth embodiment, when the engine operating state is brought transiently to the operating state in which the estimation of a cylinder air-fuel ratio is difficult, in consideration of the fact that the engine operating state is returned soon thereafter to the operating state in which the estimation of a cylinder air-fuel ratio is possible, the state variable X is only instantly reset and is not held reset, whereby the estimation of the air-fuel ratio of each cylinder is continuously performed. Thus, when the engine operating state is returned to the operating state in which the estimation of a cylinder air-fuel ratio is possible, the state variable X can be quickly updated and hence the air-fuel ratio of each cylinder can be correctly estimated.

Still further, in this sixth embodiment, when the engine operating state is steadily or transiently the operating state in which the estimation of a cylinder air-fuel ratio is difficult and the state variable X is reset, the air-fuel ratio of each cylinder is corrected by the use of the air-fuel-ratio correction quantity found just before the state variable X is reset. Thus, even when the state variable X is held reset, variations in the air-fuel ratio of each cylinder can be corrected by the use of the air-fuel-ratio correction quantity found just before the state variable X is reset. Accordingly, the exhaust emission can be improved.

Still further, the normal cylinder air-fuel ratio control is performed after a specified time elapses from the time when the reset of the state variable X is released. Thus, the cylinder air-fuel ratio control can be returned to the normal cylinder air-fuel ratio control after a time long enough to estimate the air-fuel ratio of each cylinder with high accuracy elapses from the time when the reset of the state variable X is released. Accordingly, the accuracy of the cylinder air-fuel ratio control (correction accuracy of variations in the air-fuel ratio of each cylinder) can be improved.

In this regard, the normal cylinder air-fuel ratio control may be performed after a specified time set by the crank angle or the like elapses from the time when the reset of the state variable X is released.

Furthermore, the method for estimating the air-fuel ratio of each cylinder is not limited to the method described in the sixth embodiment, but may be changed as appropriate to any method for estimating the air-fuel ratio of each cylinder on the basis of a mode relating the detected value of the air-fuel ratio sensor 37 to the state variable X (air-fuel ratio of each cylinder).

In addition, various modifications may be made without departing from the scope of the present invention, for example, the present invention may be applied to a direct injection engine as well as the intake port injection engine.

What is claimed is:

1. A cylinder air-fuel ratio control apparatus of an internal combustion engine, comprising:
    an air-fuel ratio sensor for detecting an air-fuel ratio of exhaust gas, the air-fuel ratio sensor being disposed in an exhaust collecting portion where exhaust gas of each cylinder of the internal combustion engine collects and flows,
    a cylinder air-fuel-ratio estimation means for estimating the air-fuel ratio of each cylinder on the basis of a model of relating a detected value of the air-fuel sensor to the air-fuel ratio of each cylinder as a state variable;
    a determination means for determining whether an engine operating state is an operating state in which correct estimation of the air-fuel ratio of each cylinder is difficult, the correct estimation being performed by the cylinder air-fuel ratio estimation means; and
    a state variable reset means for resetting the state variable when it is determined by the determination means that the engine operating state is the operating state in which estimation of a cylinder air-fuel ratio is difficult.

2. The cylinder air-fuel ratio control apparatus of an internal combustion engine as claimed in claim 1, wherein
    when it is determined by the determination means that the engine operating state is steadily the operating state in which estimation of a cylinder air-fuel ratio is difficult, the state variable reset means always holds the state variable reset during a period of the operating state.

3. The cylinder air-fuel ratio control apparatus of an internal combustion engine as claimed in claim 2, wherein
    the cylinder air-fuel ratio estimation means prohibits processing for estimating the air-fuel ratio of each cylinder when it is determined by the determination means that the engine operating state is steadily the operating state in which estimation of a cylinder air-fuel ratio is difficult and the state variable is reset by the state variable reset means.

4. The cylinder air-fuel ratio control apparatus of an internal combustion engine as claimed in claim 1, wherein when it is determined by the determination means that the engine operating state is transiently the operating state in which estimation of a cylinder air-fuel ratio is difficult, the state variable reset means resets the state variable only at an instant when the engine operating state becomes the operating state.

5. The cylinder air-fuel ratio control apparatus of an internal combustion engine as claimed in claim 4, wherein
when it is determined by the determination means that the engine operating state is transiently the operating state in which estimation of a cylinder air-fuel ratio is difficult and the state variable is reset by the state variable reset means, the cylinder air-fuel ratio estimation means continues processing for estimating the air-fuel ratio of each cylinder.

6. The cylinder air-fuel ratio control apparatus of an internal combustion engine as claimed in claim 1, wherein
when a rotation speed of the internal combustion engine becomes within a specified range and a load of the internal combustion engine becomes within a specified range, the determination means determines that the engine operating state is steadily the operating state in which estimation of a cylinder air-fuel ratio is difficult.

7. The cylinder air-fuel ratio control apparatus of an internal combustion engine as claimed in claim 1, wherein
when an abnormality occurs in a sensor and an actuator relating to air-fuel ratio control, the determination means determines that the engine operating state is steadily the operating state in which estimation of a cylinder air-fuel ratio is difficult.

8. The cylinder air-fuel ratio control apparatus of an internal combustion engine as claimed in claim 1, wherein
when turbulence to detection of an air-fuel ratio by the air-fuel ratio sensor occurs, the determination means determines that the engine operating state is steadily the operating state in which estimation of a cylinder air-fuel ratio is difficult.

9. The cylinder air-fuel ratio control apparatus of an internal combustion engine as claimed in claim 1, wherein
when a shift range and/or a gear position of a transmission are changed, the determination means determines that the engine operating state is transiently the operating state in which estimation of a cylinder air-fuel ratio is difficult.

10. The cylinder air-fuel ratio control apparatus of an internal combustion engine as claimed in claim 1, wherein
when control of an intake air system is changed, the determination means determines that the engine operating state is transiently the operating state in which estimation of a cylinder air-fuel ratio is difficult.

11. The cylinder air-fuel ratio control apparatus of an internal combustion engine as claimed in claim 1, further comprising
a cylinder air-fuel ratio control means for performing cylinder air-fuel ratio control of controlling the air-fuel ratio of each cylinder so as to become equal to a target air-fuel ratio on the basis of the air-fuel ratio of each cylinder estimated by the cylinder air-fuel ratio estimation means, wherein
when the state variable is reset by the state variable reset means, the cylinder air-fuel ratio control means corrects the air-fuel ratio of each cylinder by the use of an air-fuel-ratio correction quantity found just before the state variable is reset.

12. The cylinder air-fuel ratio control apparatus of an internal combustion engine as claimed in claim 11, wherein the cylinder air-fuel ratio control means returns to a normal cylinder air-fuel ratio control after a specified period elapses from when reset of the state variable is released.

13. The apparatus as claimed in claim 1, wherein the cylinder air-fuel-ratio estimation means estimates the air-fuel ratio of each cylinder using the reset state variable.

14. A method of controlling an air-fuel ratio of a cylinder in an internal combustion engine, the method comprising:
detecting an air-fuel ratio of exhaust gas with an air-fuel ratio sensor disposed in an exhaust collecting portion where exhaust gas of each cylinder of the internal combustion engine collects and flows;
estimating the air-fuel ratio of each cylinder on the basis of a model of relating a detected value of the air-fuel sensor to the air-fuel ratio of each cylinder as a state variable;
determining whether an engine operating state is an operating state in which correct estimation of the air-fuel ratio of each cylinder is difficult; and
resetting the state variable when it is determined that the engine operating state is the operating state in which estimation of a cylinder air-fuel ratio is difficult.

15. The method as claimed in claim 14, wherein
when it is determined that the engine operating state is steadily the operating state in which estimation of a cylinder air-fuel ratio is difficult, the state variable is always held reset during a period of the operating state.

16. The method as claimed in claim 15, wherein
processing for estimating the air-fuel ratio of each cylinder is prohibited when it is determined that the engine operating state is steadily the operating state in which estimation of a cylinder air-fuel ratio is difficult and the state variable is reset.

17. The method as claimed in claim 14, wherein
when it is determined that the engine operating state is transiently the operating state in which estimation of a cylinder air-fuel ratio is difficult, the state variable is reset only at an instant when the engine operating state becomes the operating state.

18. The method as claimed in claim 17, wherein
when it is determined that the engine operating state is transiently the operating state in which estimation of a cylinder air-fuel ratio is difficult and the state variable is reset, processing for estimating the air-fuel ratio of each cylinder is continued.

19. The method as claimed in claim 14, further comprising
performing cylinder air-fuel ratio control of controlling the air-fuel ratio of each cylinder so as to become equal to a target air-fuel ratio on the basis of the estimated air-fuel ratio of each cylinder, wherein
when the state variable is reset, the air-fuel ratio of each cylinder is corrected by use of an air-fuel-ratio correction quantity found just before the state variable is reset.

20. The method as claimed in claim 19, wherein
performing the cylinder air-fuel ratio control is returned to a normal cylinder air-fuel ratio control after a specified period elapses from when reset of the state variable is released.

21. The method as claimed in claim 14, further comprising estimating the air-fuel ratio of each cylinder using the reset state variable.

22. A method of controlling an air-fuel ratio of a cylinder in an internal combustion engine, the method comprising:
detecting an air-fuel ratio of exhaust gas with an air-fuel ratio sensor disposed in an exhaust collecting portion where exhaust gas of each cylinder of the internal combustion engine collects and flows;

estimating the air-fuel ratio of each cylinder on the basis of a model of relating a detected value of the air-fuel sensor to the air-fuel ratio of each cylinder as a state variable;

determining whether an engine operating state is an operating state in which correct estimation of the air-fuel ratio of each cylinder is difficult; and returning the state variable to an initial value when it is determined that the engine operating state is the operating state in which estimation of a cylinder air-fuel ratio is difficult.

23. The method as claimed in claim 22, wherein when it is determined that the engine operating state is steadily the operating state in which estimation of a cylinder air-fuel ratio is difficult, the state variable is always held at the initial value during a period of the operating state.

24. The method as claimed in claim 23, wherein when it is determined that the engine operating state is transiently the operating state in which estimation of a cylinder air-fuel ratio is difficult, the state variable is returned to the initial value only at an instant when the engine operating state becomes the operating state.

25. The method as claimed in claim 24, wherein when it is determined that the engine operating state is transiently the operating state in which estimation of a cylinder air-fuel ratio is difficult and the state variable is returned to the initial value, processing for estimating the air-fuel ratio of each cylinder is continued.

* * * * *